United States Patent [19]

Galumbeck

[11] Patent Number: 5,401,044
[45] Date of Patent: Mar. 28, 1995

[54] TWO PIECE COLLAPSIBLE WHEELCHAIR

[75] Inventor: Michael H. Galumbeck, Columbia, Md.

[73] Assignee: ReGain, Inc., Columbia, Md.

[21] Appl. No.: 969,066

[22] Filed: Oct. 30, 1992

Related U.S. Application Data

[63] Continuation-in-part of Ser. No. 741,589, Aug. 7, 1991, Pat. No. 5,211,414, which is a continuation-in-part of Ser. No. 527,295, May 23, 1990, abandoned.

[51] Int. Cl.⁶ .............................................. B62M 1/14
[52] U.S. Cl. ................. 280/250.1; 280/304.1; 297/311; 188/2 F
[58] Field of Search ............ 280/242.1, 249, 250.1, 280/304.1, 243; 180/907; 297/311, 312, 325, DIG. 4; 188/2 F, 82.7, 82.3, 82.2, 69, 31, 30

[56] References Cited

U.S. PATENT DOCUMENTS

| | | | |
|---|---|---|---|
| 287,789 | 11/1883 | Arbogast . | |
| 607,522 | 7/1898 | Noyes . | |
| 2,181,420 | 10/1937 | Everest et al. | 280/250 |
| 2,397,790 | 4/1946 | Kapusta | 74/143 |
| 2,847,058 | 8/1958 | Lee | 280/250 |
| 4,231,614 | 11/1980 | Shaffer | 297/330 |
| 4,294,774 | 2/1981 | Andreasson | 297/311 |
| 4,380,343 | 4/1983 | Lovell et al. | 280/242.1 |
| 4,574,901 | 3/1986 | Joyner | 280/304.1 |
| 4,598,944 | 7/1986 | Meyer et al. | 297/183 |
| 4,614,246 | 9/1986 | Masse et al. | 180/6.5 |
| 4,625,984 | 12/1986 | Kitrell | 280/242.1 |
| 4,685,693 | 8/1987 | Vadjunec | 280/242.1 |
| 4,733,755 | 3/1988 | Manning | 188/2 F |
| 4,758,013 | 7/1988 | Agrillo | 280/242.1 |
| 4,759,561 | 7/1988 | Janssen | 280/250.1 |
| 4,766,772 | 8/1988 | Tsuchie | 280/255 |
| 4,809,804 | 3/1989 | Houston et al. | 180/65.5 |
| 5,037,120 | 8/1991 | Parisi | 280/250.1 |
| 5,096,008 | 3/1992 | Mankowski | 180/907 |

FOREIGN PATENT DOCUMENTS

| | | | |
|---|---|---|---|
| 720851 | 7/1931 | France | 188/30 |
| 776610 | 11/1980 | U.S.S.R. | 180/907 |
| 8201314 | 4/1982 | WIPO | 297/DIG. 4 |

Primary Examiner—Karin L. Tyson
Assistant Examiner—Paul N. Dickson
Attorney, Agent, or Firm—Sixbey, Friedman, Leedom & Ferguson

[57] ABSTRACT

A lightweight, two piece wheelchair wherein both pieces are separable and optionally foldable. The wheelchair is driven manually by rotating a pair of opposed handwheels, one of which is contacted by each of the occupant's hands. When a seat positioning crank is rotated by the wheelchair occupant, a seat raising mechanism is activated which moves the seat from a horizontal sitting position to an inclined but substantially vertical position toward the front of the wheelchair. As the seat is raised, the contour of the seat is altered to provide added comfort for the occupant in the standing position.

30 Claims, 11 Drawing Sheets

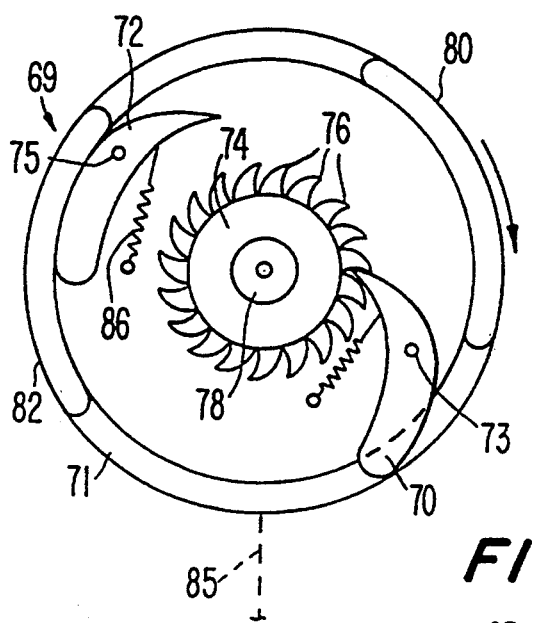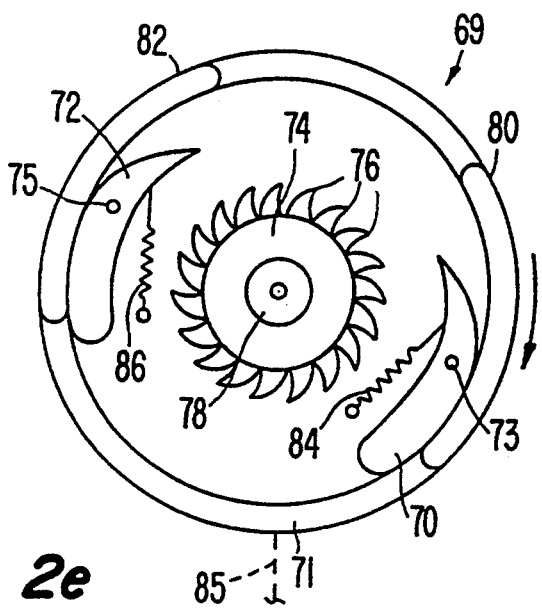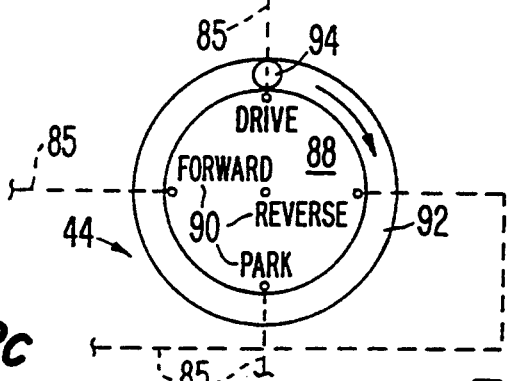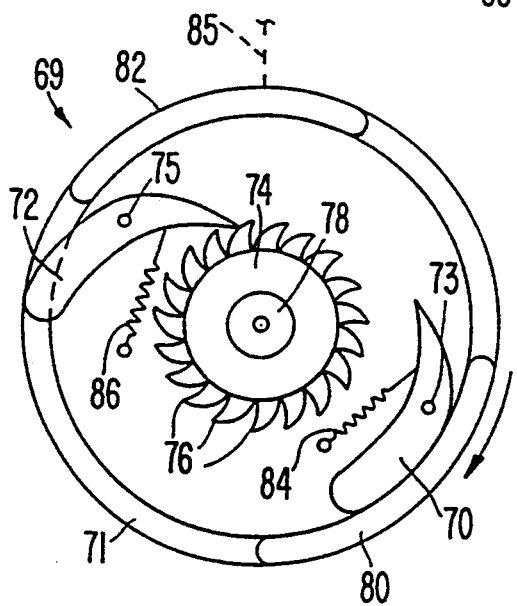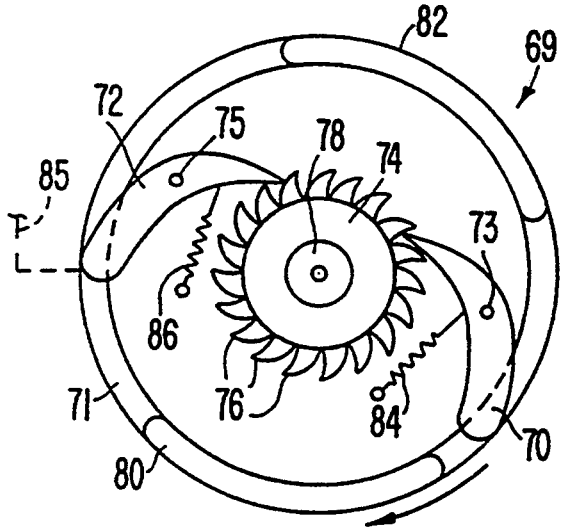

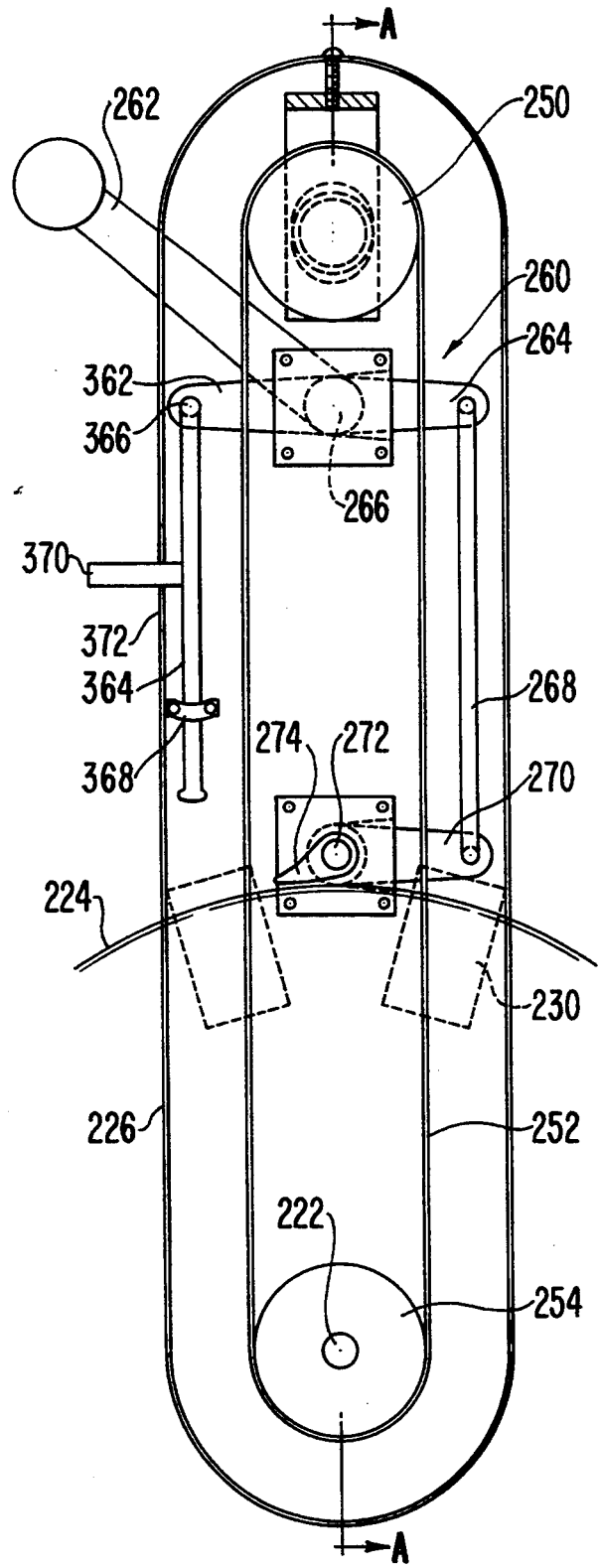
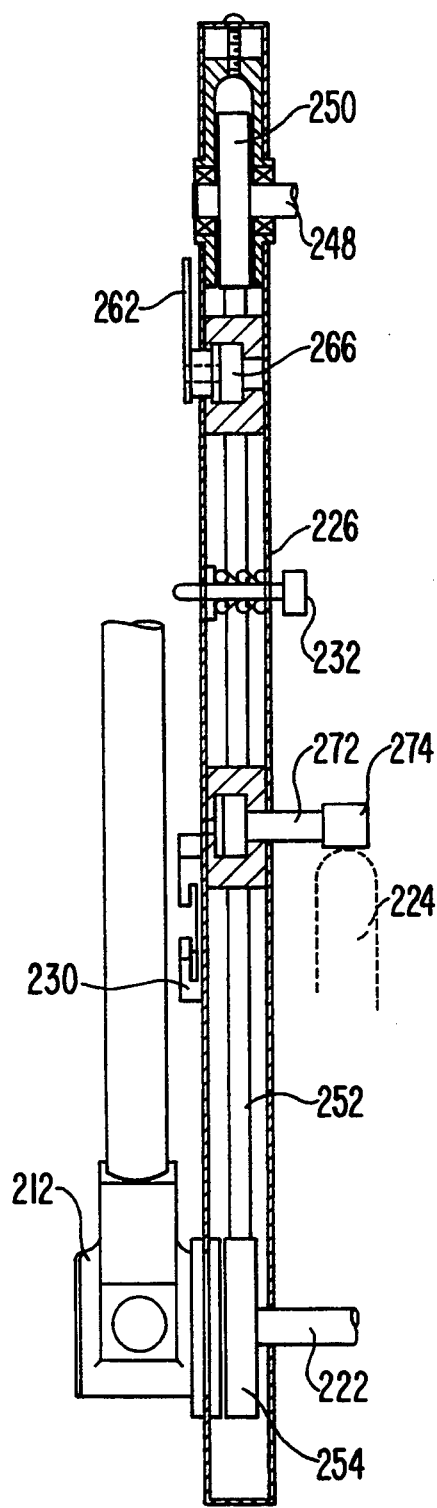
FIG. 15
FIG. 16

TWO PIECE COLLAPSIBLE WHEELCHAIR

This application is a continuation-in-part of U.S. Ser. No. 07/741,589, filed Aug. 7, 1991, now U.S. Pat. No. 5,211,414, which was a continuation-in-part of U.S. Ser. No. 07/527,295, filed May 23, 1990, now abandoned.

TECHNICAL FIELD

The present invention relates generally to collapsible wheelchairs and specifically to a foldable or collapsible two piece wheelchair designed to support an occupant in both a sitting and standing position.

BACKGROUND OF THE INVENTION

Disabled persons who are confined to wheelchairs have often found their mobility and, hence, their activities limited by the capabilities of the wheelchairs available to them. The efforts of architects and planners to make public places and private spaces accessible to the wheelchair-bound can be thwarted by the limitations of the very wheelchairs on which the handicapped must depend for access to all parts of their environment. Currently, available wheelchairs include those that are motor driven and those that are driven manually. The high cost of motor driven wheelchairs, which are powerful enough to negotiate many different types of surfaces and terrains, puts them beyond the reach of large numbers of those who need them. The available manually driven wheelchairs, moreover, are often difficult to drive, especially up inclines, over curbs and on uneven terrain. In addition, the majority of these wheelchairs restrict the user to a sitting position. Those wheelchairs that enable their users to assume a standing position are expensive, complex and uncomfortable.

The design of currently available manually driven wheelchairs, moreover, presents many disadvantages and limitations. Two large drive wheels, which are usually positioned on each side near the center of gravity of the wheelchair, support the wheelchair and contact the ground, floor or other base surface on which the wheelchair rests. These large wheels are moved by the user's hands to propel the wheelchair in the direction desired. This is difficult for many infirm wheelchair occupants, as the large wheels on most wheelchairs are located at the rear of the chair, and the occupant must reach back to grasp and propel the wheel. This requires an upper body strength that many handicapped and infirm persons do not have.

Additionally, because the user must usually contact the large drive wheels directly to propel the wheelchair, the user's hands and clothing tend to become soiled during travel, particularly during inclement weather and during travel over surfaces covered with dirt, oil, or other foreign matter which can be picked up by the wheelchair wheels.

To avoid the problems presented by dirt and foreign matter carried by the wheels of a wheelchair, handwheels have been provided which do not contact the wheelchair support surface but which are linked to the wheelchair wheels by a propulsion linkage system. U.S. Pat. Nos. 2,181,420 to Everest et al, 4,380,343 to Lovell et al and 4,625,984 to Kitrell disclose wheelchairs driven by hand wheels which are manually rotated by the wheelchair occupant to drive ground contacting wheels and propel the chair. However, the practice has been to position these handwheels toward the center or rear of the chair, thereby requiring the wheelchair occupant to reach back to grasp the leading edge of the handwheel.

It has been found that less upper body strength is required to propel a wheelchair if the occupant is reaching forward from a sitting position and is propelling the wheelchair by moving the arms from a partially to a fully extended forward position. In an attempt to take advantage of this fact, wheelchairs have been developed with manual drives positioned forwardly of the wheelchair seat. U.S. Pat. Nos. 287,789 to Arbogast and 4,758,013 to Agrrillo are illustrative of powered wheelchairs of this type, but it will be noted that these forwardly positioned wheelchair drives are dual crank drives. Dual crank drives make it difficult for a wheelchair occupant to synchronize the cranking power provided to opposite cranks and require power to be provided by a rotary motion of the arms rather than by the pushing motion used to turn a handwheel. This rotary motion is difficult for many infirm persons to achieve for prolonged periods with sufficient energy to propel the wheelchair.

To allow the wheelchair user virtually unlimited mobility, the chair should support the user adequately in a sitting position for travel. The chair should, in addition, permit the user to assume a standing position supported as needed by the wheelchair in a manner that permits the user to use and, thus, strengthen those parts of the body which he or she is capable of using. Wheelchairs that adjust to support the occupant in both a sitting and a standing position are known. For example, the wheelchair disclosed in U.S. Pat. No. 4,809,804 to Houston et al. achieves this objective. However, the seat assembly in this patent is a complex, motor driven apparatus that leaves the occupant in an extremely uncomfortable upright position with only limited mobility.

In moving a wheelchair occupant from a sitting to a standing position, it is critical that both positions provide adequate and comfortable support if the wheelchair is to function efficiently. It is substantially useless to suspend an occupant uncomfortably from a chest strap assembly in a standing position as often occurs if the user of the chair is a paraplegic or a multiple amputee. The chair should be designed to distribute pressure to the back, buttocks and thighs of a user in the standing position.

Finally, although collapsible folding wheelchairs are well known, these chairs are often extremely heavy and bulky, even when folded, making it difficult for some women and elderly persons to load and unload the folded wheelchair from an automobile or other vehicle. Consequently a need exists for a collapsible wheelchair which is lightweight and easy to handle, and which may be effectively propelled without assistance by occupants who are elderly, infirm, or who do not possess much upper body strength. A need also exists for a wheelchair which can be adjusted by the user to move the user comfortably between a sitting and a standing position, and which will maintain the user comfortably in either position for a prolonged period of time.

SUMMARY OF THE INVENTION

It is a primary object of the present invention, therefore, to overcome the disadvantages of the prior art and to provide a manually driven wheelchair which affords the user maximum mobility of travel and position without assistance.

It is another object of the present invention to provide a manually driven wheelchair which is easily driven by the user without assistance over different types of terrain and travel surfaces.

It is yet another object of the present invention to provide a manually driven wheelchair including a dual function drive mechanism which can be manually actuated by the occupant both to drive the wheelchair and to change the position of the occupant from sitting to standing.

It is a further object of the present invention to provide a wheelchair that allows its user to move from a sitting position to a comfortable, fully supported standing position.

It is yet a further object of the present invention to provide a manually driven wheelchair with a handwheel actuated arrangement that is easily activated to drive the wheelchair in a desired direction of travel.

It is a still further object of the present invention to provide a manually driven wheelchair including a frame which is both adjustable for optimal user fit and foldable for maximum user convenience.

It is yet another object of the present invention to provide a wheelchair having a foldable frame assembly which includes a drive mechanism for the chair and a foldable seat assembly which is detachably mounted on the frame assembly and which includes a seat which is driven between two vertical positions by a seat drive mechanism. In the uppermost position, the seat is reconfigured to provide both user support and comfort.

It is a still further object of the present invention to provide a wheelchair having a manual drive mechanism which includes hand wheels positioned adjacent to the forward section of the wheelchair seat and extending for a substantial distance above the seat. The seat is driven upwardly from a first to a second position by manual operation of a manual seat drive mechanism, and in the second position, the sides of the seat are driven upwardly so that the ischials and tailbone of the chair occupant are suspended over an open central pocket.

The aforesaid objects are achieved by providing a lightweight, collapsible, manually driven wheelchair with a pair of opposed hand wheels connected through a drive gear, a pulley and belt, or a sprocket and chain drive to a pair of opposed, non-pivoted travel wheels which support one end of the wheelchair on the ground or other travel surface. A pair of pivoted, non-driven travel wheels support the opposite end of the wheelchair. A manual drive mechanism is provided to permit a user to drive the wheelchair seat from a user sitting to a standing position. A wheelchair brake must be engaged before the drive mechanism can be activated to drive the seat to the standing position. In the standing position, a front portion of the seat drops away, and a rear portion of the seat reconfigures to provide a comfortable support for the user's buttocks.

Other objects and advantages will be apparent from the following description, claims and drawings.

BRIEF DESCRIPTION OF THE DRAWINGS

FIGS. 2a–2e illustrate the gearing and gear selector positions for the wheelchair of FIG. 1;

FIG. 15 is a longitudinal sectional view of the drive housing for the wheelchair of FIG. 10;

FIG. 16 is a sectional view taken along lines A—A of FIG. 15;

DESCRIPTION OF THE PREFERRED EMBODIMENTS

A primary objective of the present invention is to provide a wheelchair that does not present additional limitations to those persons whose health or physical disabilities confines them to this device. Handicapped persons are encouraged by their physicians, physical therapists and, increasingly, by the public at large to expand their horizons and to participate in many activities once thought to be beyond the reach of the handicapped or disabled. Unfortunately, many of those who want to become more active are limited significantly by the wheelchairs in which they are confined so that they do not have the physical mobility which enables them to exercise control over their environment. The present invention provides a versatile, lightweight manually driven wheelchair that is easy to manufacture and, therefore, less expensive than motor driven wheelchairs. The present wheelchair, moreover, allows the occupant complete control over the travel of the wheelchair and, in addition, permits the occupant to change him- or herself from a sitting to a standing position without assistance. As a result, the wheelchair of the present invention affords the user substantially more freedom and mobility than currently available wheelchairs and permits a measure of independence not heretofore achieved with manually operated wheelchairs.

Figure 1:
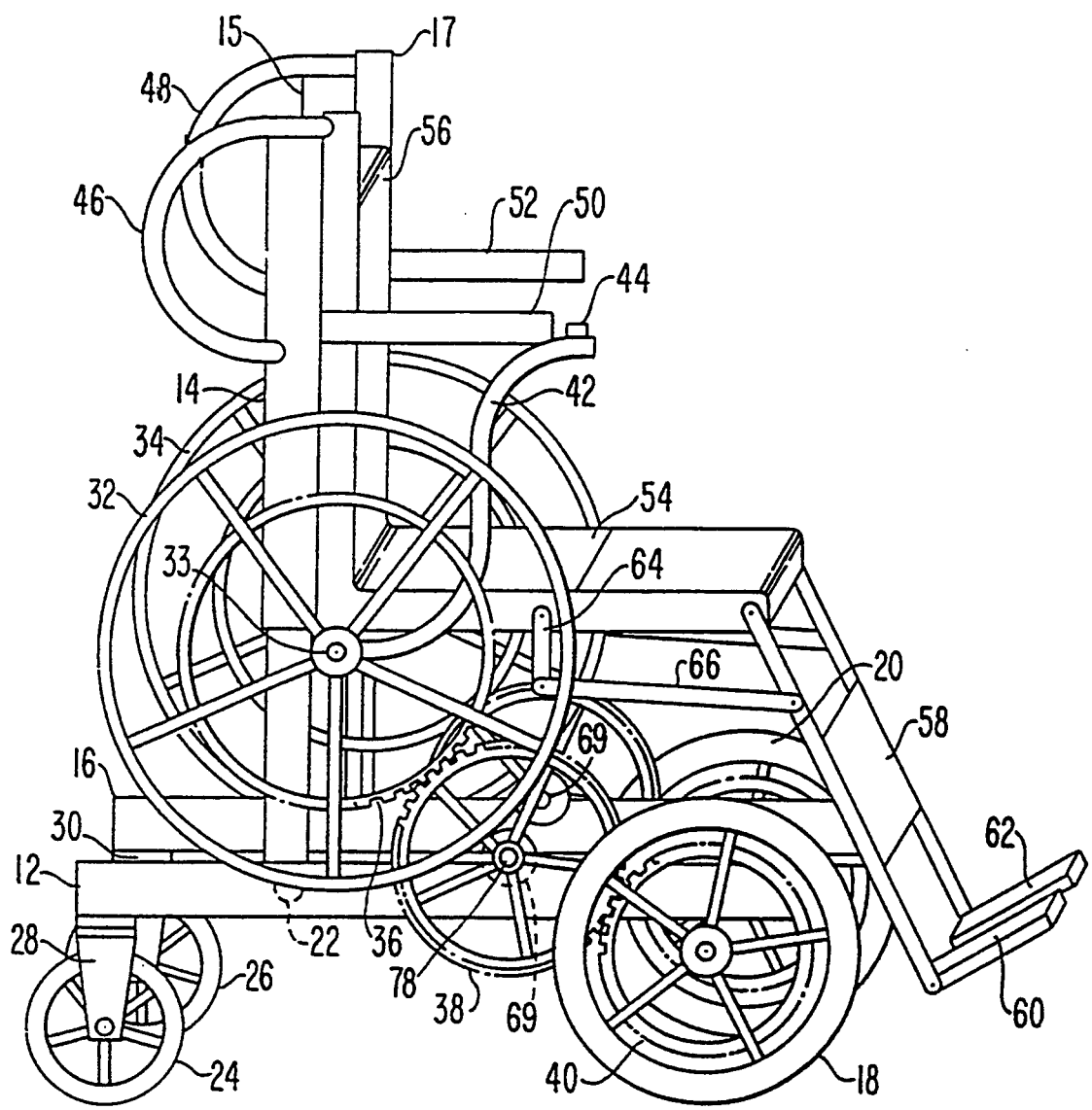
FIG. 1 is a side view of the wheelchair of the present invention.

Referring to the drawings, FIG. 1 illustrates, in side view, the wheelchair 10 of the present invention. The main supporting frame has a very simple inverted letter "T" shape and includes a base bar 12, which is the top of the "T", and a seat support bar 14 perpendicular to the base bar, which is the stem of the "T". The seat support bar 14 is secured to the base bar 12 at a point that is offset from the center toward the rear of the wheelchair and corresponds to the center of gravity of the chair to provide adequate space for the drive gears, as will be discussed in detail hereinbelow. A second base bar 16 and a second seat support bar 17 are joined to bars 12 and 14 by a pair of cross bars (not shown). One cross bar extends between the base bars 12 and 16 near the centers of the front wheels 18 and 20. The second cross bar, one end 22 of which is shown in dashed lines on the base bar 12, is located at the intersection of the base bar and the seat supported bar, so that it is substantially aligned with the center of gravity of the chair.

This basic frame is preferably constructed of a lightweight material, such as aluminum, that is also durable and heavy enough to provide stability to the wheelchair. The frame may be made to be adjustable by telescoping the cross bars so that the distance between the wheelchair base bars and seat support bars which make up the side frames can be varied according to the size of the wheelchair occupant. The ability to adjust the chair's width to the person's width as described allows custom fit at low cost and can significantly enhance the comfort of the chair. In addition, the cross bars may be hinged to make the wheelchair frame foldable.

Unlike many currently available manually driven wheelchairs, the front wheels 18 and 20 are non-pivoting and are mounted near each end of one of the cross bars (not shown). The rear wheels 24 and 26 are pivotally mounted to wheel brackets 28 and 30, respectively, at the rear end of base bars 12 and 16. The non-pivoting from wheels 18 and 20, which are larger than the pivoting rear wheels 24 and 26 are positively driven and thus allow the user more control over steering and greater maneuverability than has been heretofore possible with manually driven wheelchairs.

The wheelchair of the present invention employs a drive mechanism that differs significantly from those typically found on manually driven wheelchairs. A pair of handwheels 32 and 34 are rotatably mounted on the seat support bars, one on the right bar 14 and one on the left bar 17. These handwheels are grasped and turned by the wheelchair occupant to drive the chair. The handwheels 32 and 34 do not touch the ground or travel surface of the wheelchair; nor do they contact indirectly any structure that contacts the wheelchair travel surface. Therefore, these wheels stay much cleaner than if they did contact the travel surface, either directly or indirectly. Manually operated wheelchairs currently in use have a combined drive wheel/travel wheel, which is grasped and pushed by the user to move the chair. As a result, any dirty or undesirable surfaces over which the wheelchair travels are contacted directly by this type of handwheel and, hence, by the user's wrist or sleeves. The present design avoids this so that the user is not required to reach over a dirty wheel with his or her hands to move the wheelchair.

The handwheels 32 and 34 are drivingly connected through a series of drive gears to the wheelchair front wheels 18 and 20. The drive gear mechanism will be explained primarily in connection with the right handwheel 32 and the right front wheel 18; however, the drive gear mechanism operates in the same manner on the left side. The handwheel 32 includes a toothed drive gear 36 which is spaced inwardly toward the center 33 of handwheel 32. The handwheel drive gear 36 engages a toothed central drive gear 38, which is rotatably mounted on the base bar 12. The central drive gear 38 provides a driving connection between the handwheel 32 and a toothed wheel drive gear 40 located on the front wheel 18. A shift lever 42 includes a gear selector knob 44 which may be actuated to change gears in a manner which will be explained in detail below.

The wheelchair 10 of the present invention also includes a pair of handles 46, 48 which can be used to push the chair, if necessary, and also to provide a convenient handgrip for someone folding the chair. Arm rests 50, 52 are preferably attached to each of the seat support bars at a convenient height for supporting the occupant's arms. A padded seat 54 and back rest 56 are secured between the seat support bars and are configured to support the user's body in both a sitting and a standing position, as will be explained in detail hereinbelow. A leg rest 58, which is also preferably padded, is pivotally connected to the seat 54 and terminates in two folding foot rests 60, 62.

The leg rest 58 is secured to a leg rest bracket 66, which is pivoted to the end of a seat extension bracket 64 secured to the seat 54. These connections support the leg rest in an optimum position and allow it to be pivoted toward the back of the wheelchair, as will be discussed in connection with FIGS. 8 and 9, when the chair is moved from a sitting to a standing position.

The travel direction of the present wheelchair can be easily and effectively controlled by the user in a manner which allows the user maximum self-sufficiency. FIGS. 2a–2e illustrate the different gears which may be selected by the wheelchair user to control travel of the wheelchair. The gear selector knob 44 on shift lever 42 is designed to be turned clockwise by the user to the desired gear selection. Preferably, four gear selections are included: drive, forward, reverse, and park. However, additional gears could also be included, for example, one or more low gears. A conventional differential (not shown) is mounted in a convenient location on the wheelchair to transmit the gear selection, preferably through suitable cables, to the appropriate gear structures.

Preferred for use with the present invention is the arrangement of cams, ratchet gear and pawls shown in FIGS. 2a–2d and 3. This gear mechanism 69 is mounted on the shaft 78 that supports the central drive gear 38 on the opposite side of the base bar from the central drive gear 38. The gearing for only one side of the wheelchair is described; however, both the right and left gear mechanisms are identical.

Each gear mechanism 69 includes a selector plate 71 and two pivotally mounted curved spring biased pawls 70 and 72, respectively on stationary shafts 73 and 75. The configuration of the selector plate 71 is selected to permit the plate to rotate relative to the pawls 70, 72 and their springs 84, 86 which do not rotate with the gear selector plate 71. One useful configuration is the ring or "donut" shape shown in FIGS. 2a–2d. The gear selector plate 71 could also be formed form a solid plate with slots (not shown) to receive the pawl support shafts 73, 75 and springs 84, 86 sized to permit the required rotation of cams 80, 82. The pawls 70 and 72 are mounted relative to each other so that pawl 70 is forward of pawl 72. Pawl 70 is referred to as the "front" pawl, while pawl 72 is referred to as the "rear" pawl. Shafts 73 and 75 are different lengths to pivotally mount the pawls 70 and 72 at different elevations relative to a central ratchet gear 74, as will be explained in detail in connection with FIG. 3.

A central ratchet gear 74 which is keyed to the shaft 78 that supports the central drive gear 38, is located in the center of the gear mechanism and includes a plurality of angled curved teeth 76, 77 that extend around the circumference of the ratchet gear. These teeth are arranged in two stacked circumferential rows as described in connection with FIG. 3. Only the row of teeth 76 can be seen in FIGS. 2a-2d. The row of teeth 77 is located directly below teeth 76. The selector plate 71 is mounted for rotation relative to central shaft 78, which supports the central drive gear 38.

The selector plate 71 includes two cams 80 and 82 which are rotated in a clockwise direction with the selector plate in response to the rotation of the gear selector knob 44, shown in detail in FIG. 2(e). The gear selector knob is connected to the gear mechanism 69, specifically to the selector plate 71, through suitable cables and a conventional gearing or differential shown in dashed lines 85. The differential holds the selector plate 71 stationary once a gear has been selected so that the pawls 70, 72 are held in the required positions while the wheelchair is in the selected gear.

The curved pawls 70, 72 are normally spring biased by springs 84, 86 to engage the curved teeth 76, 77 of the ratchet 74 to assume the positions shown in FIG. 2d, which is "Park". However, when the gear selector knob is rotated to select a gear other than "Park", the selector plate 71 and cams 80, 82 rotate, and one or both pawls 70, 72 may be caused to pivot out of engagement with the teeth 76, 77 by the cams. This arrangement allows limitation of the travel direction of the wheelchair to a "Forward Only" or to a "Reverse Only" mode.

FIG. 2a illustrates the relative positions of the pawls 70 and 72 when the gear selector knob has been turned to the "Forward Only" position. Both the gear selector knob and the selector plate 71 always rotate only clockwise. In the "Forward Only" position, the front pawl 70 is spring biased to engage the ratchet gear teeth 76, and the rear pawl 72 is pushed out of engagement with the teeth 77 by contact with cam 82.

The front travel wheels 18, 20 must rotate in a clockwise direction to move the wheelchair forward. To accomplish this, the wheelchair occupant must move the handwheels 32, 34 clockwise. The clockwise movement of the handwheel is transmitted to the central drive gear 38, which must then rotate counterclockwise to drive the travel wheel 18 in a clockwise, or forward, direction. The ratchet gear 74 is rotatably mounted on shaft 78 and thus rotates counterclockwise with the central drive gear 38.

If the wheelchair is caused to move in a reverse direction, the direction of rotation for the handwheel 32, central drive gear 38 and the front travel wheel 18 would have to be reversed so that the travel wheel and handwheel would be rotating counterclockwise, and the central drive gear and ratchet gear 74 would then rotate clockwise. However, when the gear mechanism is in the "Forward Only" position of FIG. 2a, the clockwise rotation of the ratchet gear 74 will be prevented by the engagement of pawl 70 in the teeth 76. It will be noted from FIG. 2a that the ratchet gear teeth 76 are curved toward the pawl 70 so that when the ratchet gear 74 rotates counterclockwise, the pawl can skip over the teeth 76 without fully engaging them. The clockwise rotation of the ratchet gear 74, however, will cause the pawl 70 to be fully engaged by the teeth so that the ratchet gear cannot rotate. Because the ratchet gear is mounted to drive the central drive gear 38, the central drive gear will also be prevented from rotating clockwise. As a result, neither counterclockwise rotation of the handwheels nor counterclockwise rotation of the travel wheels can cause the wheelchair to move in a reverse direction.

When the gear is in the "Forward Only" position, the wheelchair can only be propelled in a forward direction and cannot be moved in a reverse direction because the central drive gear 38 is prevented from rotating clockwise. Therefore, if the occupant is maneuvering the chair up a ramp or other incline and must stop before reaching the top, the chair will not roll backward. This is in distinct contrast to prior art manually driven wheelchairs, which would drift back down the ramp or incline because they do not have gearing or like mechanisms to limit the direction of travel.

FIG. 2b illustrates the positions of the pawls, ratchets and cams when the gear selector is in the "Drive" position shown in FIG. 2e. When the "Drive" gear is selected, the cams 80 and 82 are rotated so that both pawls 70 and 72 are moved out of engagement with the ratchet gear teeth 76, 77 by the cams. Because neither of the pawls 70, 72 is engaged by the ratchet gear teeth 76, 77 the ratchet gear 74 and the corresponding central drive gear 38 can rotate both counterclockwise and clockwise. Consequently, the wheelchair will move in both forward and reverse directions, and the rearward travel of the wheelchair is not prevented, as in the FIG. 2a gear configuration. This gear is especially suitable for forward travel on relatively flat surfaces.

Figure 3:
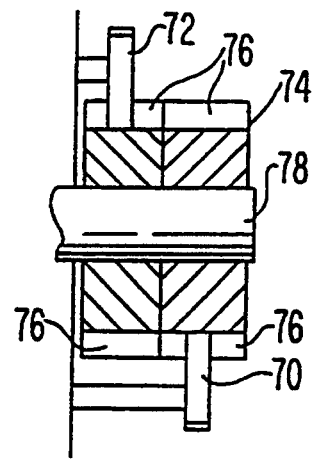
FIG. 3 is an end view of part of the gearing system mounted in place on the wheelchair frame.

FIG. 2c illustrates the "Reverse Only" gear. Rotation of the gear selector knob to this gear moves the front pawl 70 out of engagement with the teeth 76 by cam 80, while the rear pawl 72 is not contacted by cam 82. Spring 86 is then able to bias pawl 72 into engagement with the teeth 77 of the ratchet gear 74. Movement of the wheelchair in a reverse direction requires the counterclockwise rotation of the handwheel 32 and travel wheel 18. The central drive gear 38 must then rotate clockwise. To prevent the forward movement of the wheelchair when the "Reverse Only" gear is selected, the counterclockwise rotation of the central drive gear 38 must be prevented. This is accomplished by providing a second circumferential row of gear teeth 77 on ratchet gear 74 which are curved to allow the rear pawl 72 to skip over the teeth as the ratchet gear 74 rotates clockwise, but to be positively engaged by the teeth if the ratchet gear is rotated counterclockwise. FIG. 3 illustrates in more detail the dual rows of oppositely curved teeth 76 and 77. When this gear is selected, the wheelchair can only travel in a reverse direction. If the wheelchair user wants to travel backward up an incline, the chair will not drift forward when the drive mechanism is in this gear.

FIG. 2d illustrates the gear position when "Park" has been selected. In this position, neither cam 80 nor cam 82 contacts a pawl, and both pawls 70, 72 are biased by their respective springs 84, 86 into engagement with the ratchet teeth 76, 77. The wheelchair, therefore, will not travel either forward or backward when the handwheels 32, 34 are pushed by the occupant because the ratchet gear 74 and, thus, the central drive gear 38 are prevented from rotating either clockwise or counterclockwise.

FIG. 2e illustrates the details of one preferred type of gear selector knob 44, which is preferably located on top of the shift lever 42 (FIG. 1). A central panel 88 includes identifying indicia 90 showing the four gears. An outer rotating selector 92 including an indicator knob 94 is provided to enable the user to turn the selector clockwise to indicate the gear desired. The selector is in the "Drive" position in FIG. 2e.

FIG. 3 illustrates the spatial relationship between the front pawl 70 and the rear pawl 72 relative to the two stacked circumferential rows of teeth 76 and 77 in the gear mechanism 69. The front pawl 70 is pivotally mounted on shaft 73 to contact the outer or top row of teeth 76 on the ratchet gear 74. The rear pawl 72 is pivotally mounted on shaft 75 to contact the inner or bottom row of teeth 77. Therefore, shaft 73 must be longer than shaft 75 to position the pawls at the optimum positions for engaging the ratchet gear teeth.

The drive gear system shown and described in connection with FIGS. 2a-e and 3 may be modified to provide the wheelchair user additional control over the travel speed of the wheelchair. For example, one or more low gears could be provided to allow the user the capability to slow the speed of the chair when desired. A gear with braking could be used for this purpose. Other speed-varying gears could be employed as well to expand further the travel capacity of the wheelchair.

Figure 4:
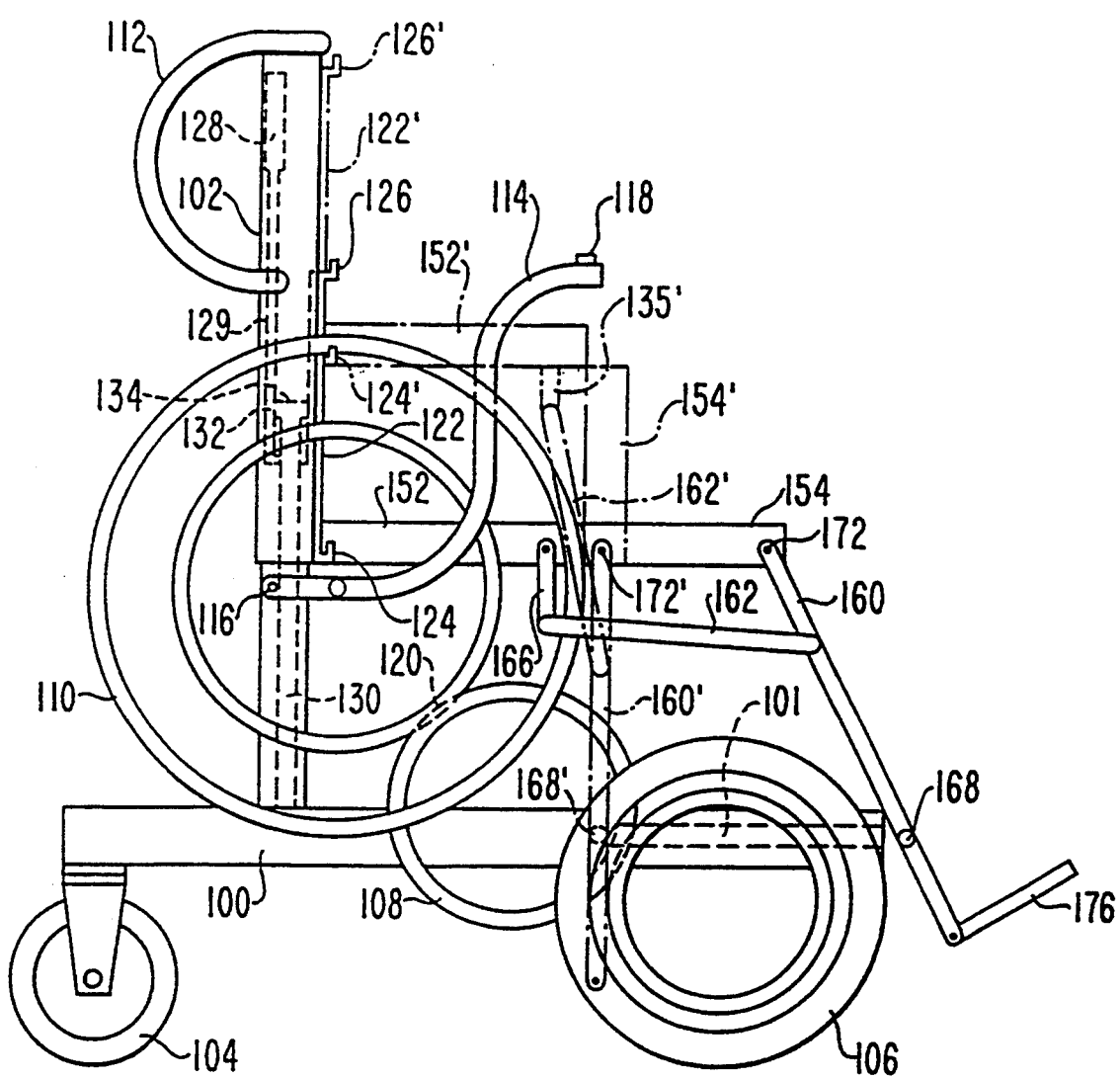
FIG. 4 is a schematic side view of the wheelchair frame showing the seat positioning mechanism.

Not only does the gearing system of the present wheelchair provide the user substantially complete control over the travel direction of the wheelchair, but this system also controls the position of the seat. The wheelchair user can simply operate a single shift lever to actuate the mechanism that controls the travel of the chair and that changes the position of the seat. FIG. 4 illustrates, schematically, these control mechanisms. Only one side of the chair, the right side, is shown in FIG. 4. However, the seat position control system could also be located on the left side of the wheelchair. Ideally, the side on which the shift lever and controls are located will be selected based upon whether the user is right-handed or left-handed or must have the controls located on one side or the other to enable him or her to operate the gearing system effectively.

The wheelchair structures shown schematically in FIG. 4 correspond to those similar structures shown in FIG. 1. The wheelchair frame includes a base bar 100 and a seat support bar 102, which support the gearing system and controls, as well as the seat and leg rest, which are not shown in FIG. 4. The base bar 100 supports the pivoted rear travel wheel 104 and the non-pivoted front travel and gear wheel 106 and the central drive gear wheel 108. The seat support bar 102, which is also supported by the base bar 100, supports the handwheel 110, a handle 112, and a shift lever 114. The shift lever 114 is mounted on the seat support bar about a pivot point 116, which allows the shift lever to be moved downwardly or upwardly relative to the wheelchair travel surface.

The shift lever also includes a gear selector knob 118, such as that shown in FIG. 2e. The drive gearing mechanism 69 shown and discussed in connection with FIGS. 2a-2e and 3 is operatively rotatably mounted on the base bar on the same shaft as the central drive gear wheel 108 (wheel 38 in FIG. 1) at 109 so that the gear selector knob 118 can be easily manipulated by the wheelchair user to actuate the drive gear selected.

The shift lever 114 performs a dual function and can be manipulated by the wheelchair user to actuate the mechanism that automatically moves the seat, leg rest and foot rests out of the way so that the user can change his or her position from sitting to standing without changing the center of gravity of the wheelchair. This is accomplished by moving the shift lever 114 upwardly, which simultaneously moves the handwheel gear 120 from contact with the drive gear wheel 108. A vertical motion selector structure (not shown) is preferably included on the shift lever at a convenient location near the gear selector knob. Movement of the handwheel after its disengagement by the shift lever 114 will not move the wheelchair in a horizontal travel direction. When the shift lever is lifted to disengage the handwheel 110 from the travel gearing system, the handwheel simultaneously engages a seat positioning gear (FIGS. 6 and 7), which raises or lowers the seat in response to movement of the handwheel 110.

A seat slide 122 is attached to the seat support bar so that it can slide between predetermined upper and lower points on the seat support bar. A pair of seat support pins 124, 126 is provided on the seat slide to hold the wheelchair seat 152, which is preferably removable. The seat slide 122 is shown in FIG. 4 in the position it assumes when the seat 152 is in the optimum sitting position. Movement of the handwheel 110 will raise the seat slide so that the seat support pins occupy the positions shown in dashed lines at 124' and 126', the seat is in the position shown in dashed lines at 152, and the seat slide is in the position shown in dashed lines at 122'.

When the seat 152 is in the raised position shown in dashed lines 152', the front section 154 pivots downwardly to the position shown in dashed lines 154'. The leg rest 160, which is pivoted to the seat front section 154 at 172 is pulled toward the rear of the seat when the seat is raised and causes the seat to pivot downwardly. A leg rest bracket 162 pivoted to a seat bracket 166, which supports the leg rest when the seat is in the sitting position, assumes the positions shown in dashed lines 162' and 166' when the seat 152 is raised. The movement and positions of the seat front, leg rest, foot rest, and brackets are described below in more detail in connection with FIGS. 8 and 9. The leg rest 160 includes a knob 168 which may be used to adjust the leg rest, as described below, but which also guides the leg rest out of the wheelchair user's way when the seat is raised to a standing position. The knob 168 is received in a channel 101 in the base bar 100 so that it can slide within the channel as required to allow the leg rest 160 and leg rest bracket 162 to move from the sitting to the standing position and back to the sitting position.

When the wheelchair seat is in the sitting position shown in FIG. 1 and in solid lines in FIG. 4, the occupant is fully supported in a sitting position so that most of his or her body weight is borne by the seat, although the leg rest and foot rests can also provide some support, if needed. Because most persons who use wheelchairs are generally unable to stand unassisted, the design of the present wheelchair provides support for the user when the chair is in a standing position. The articulated seat has been designed so that the rear seat portion 152 remains perpendicular to the wheelchair back when the front section 154 and leg rest drop back, and the height of this rear seat portion 152 can be controlled by the user by turning the handwheel 110. The height of the seat portion 152 can be adjusted so that it is just under the user's buttocks.

Depending upon his or her degree of mobility or if the user is unable to assume a completely vertical position, the seat rear section 152 will function as a support for the user's buttocks and lower extremities. A seat belt around the user's waist may be required in some cases. Locating supporting structure at this part of the body instead of providing the chest straps used by currently available wheelchairs enables the wheelchair user to assume a substantially more comfortable, yet secure standing position. Moreover, unlike with the prior art wheelchairs, each individual wheelchair user can, unassisted, manually move the chair from a sitting position to a standing position and can additionally adjust the rear seat section to the optimum height for providing maximum support.

When it is desired to lower the seat so that the seat slide 122 is in the position shown in solid lines, the wheelchair user merely turns the handwheel 110 in the opposite direction. The seat front section 154 and leg rest 160 will then return to the solid line positions shown in FIG. 4. Once the seat is fully lowered, downward movement of the shift lever 114 by the wheelchair user will disengage the handwheel from the seat positioning gears and engage the handwheel with the travel wheel drive gears so that the wheelchair is again ready for horizontal travel.

Figure 6:
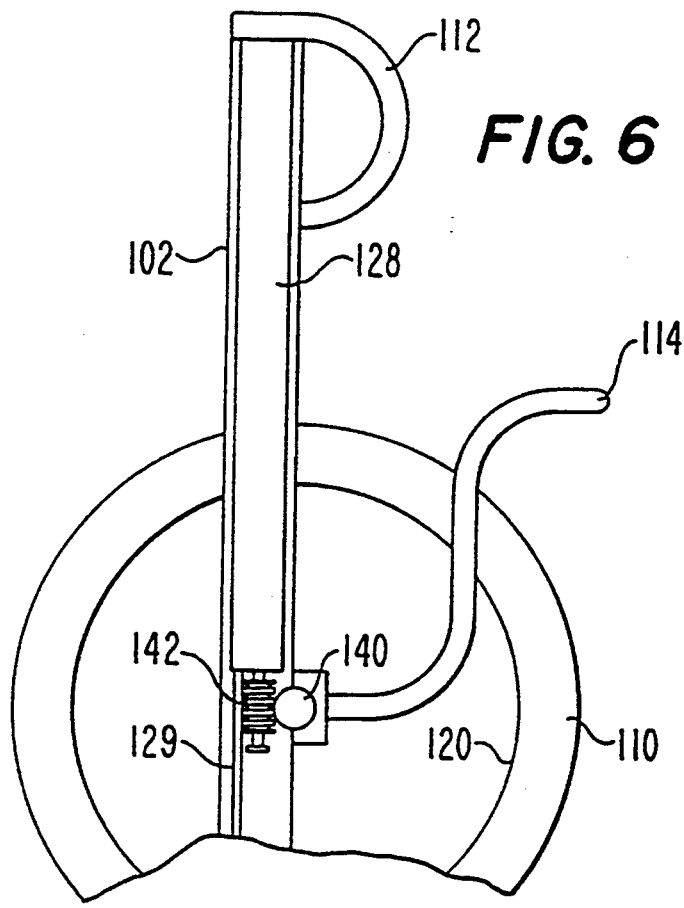
FIG. 6 illustrates one seat positioning embodiment.
Figure 7:
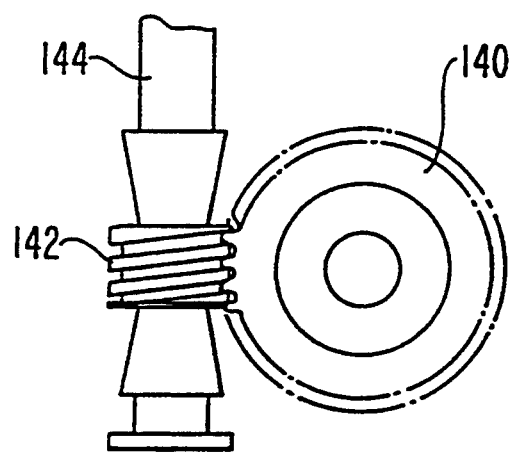
FIG. 7 illustrates details of the seat positioning embodiment of FIG. 6.

One arrangement which may be effectively used to change the seat position is shown in FIGS. 6 and 7 discussed in detail in connection with FIG. 8. However, other mechanisms which may be easily activated by the simple movement of the shift lever and handwheel as described above may also be employed. A pump 128 is connected to a gas cylinder 130 by a tube 129 and is mounted to the side of the seat support bar 102 opposite that shown in FIG. 4. Depending on the specific materials chosen to form the seat support bar, the cylinder and pump might also be mounted inside the seat support bar. If this arrangement is used, the seat slide 122 is connected to a piston (not shown) associated with the gas cylinder, preferably at the upper end 132 of the cylinder at connection point 134. As the handwheel 110 is rotated in the appropriate direction, the piston is moved upwardly toward the handle 112 by gas pumped into the cylinder. When the piston has risen to its maximum height, the seat slide will occupy the position 122'. The seat slide is lowered by rotating the handwheel 110 in the opposite direction. This releases gas from the cylinder and causes the piston to return to the position shown in FIG. 4.

Figure 5:
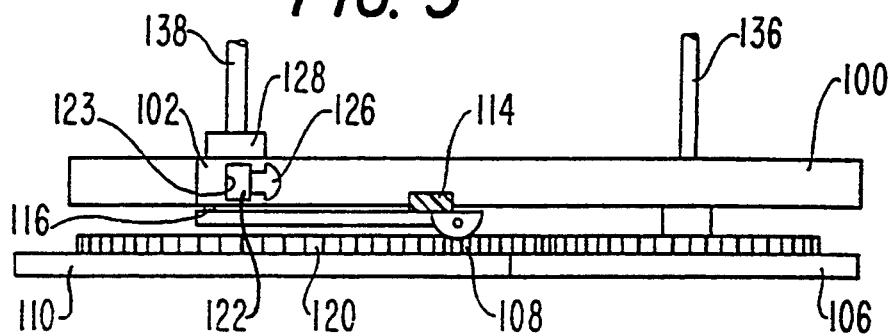
FIG. 5 is a top plan view of one side of the wheelchair frame showing the seat retraction gearing.

FIG. 5 illustrates, in top view, the structures shown in FIG. 4, which are actuated to engage and disengage the drive gears and the seat positioning gears. The base bar 100 is shown relative to the seat support bar 102, the front wheel 106, the central drive gear wheel 108, the handwheel 110 and the handwheel gears 120. The seat slide 122 is preferably located in a channel 123 in the seat support bar so that it can slide between the desired seat positions as required. The pump 128 is mounted to the inside of the seat support bar 102 so that it is not visible from the side view of FIG. 4. The two crossbars 136, 138 that connect the right and left base bars are shown in their relative positions. The gears in FIG. 5 are shown in the engaged position. However, when the shift lever 114 is raised, the handwheel gear 120 is moved out of engagement with the gear of the central drive gear wheel 108 so that there is no driving connection between the handwheel and the drive gears. The handwheel is then free to engage the pump gear and raise the seat slide. Downward movement of the shift lever 114 will move the handwheel drive gear 120 into engagement with the central drive gear wheel 108.

FIGS. 6 and 7 illustrate, in detail, the embodiment of the seat positioning mechanism shown in FIG. 4. Structures will be designated by the same reference numerals as in FIG. 4. FIG. 6 shows the pump, but does not show the cylinder and piston used to change the seat level. It is preferred to employ a single pump 128 capable of operating two piston and cylinder assemblies. One piston and cylinder assembly, such as the cylinder 130 of FIG. 4 and its associated piston (not shown) is located on each side of the wheelchair seat. One assembly is attached to each seat support bar so that both sides of the seat are raised simultaneously by the pump. One type of pump preferred for this purpose is the Movetec Ergonomic System Pump TB/TS available from Movetec AB of Boras, Sweden. This type of pump can be installed to operate the two cylinders required to change the position of the seat most effectively. Preferred for use with the Movetec pumps are the Movetec Ergonomic System Series CX1 single-acting cylinder and piston assemblies. However, other available pumps and cylinder and piston assemblies adaptable for installation on a wheelchair and operation by a geared wheelchair handwheel as described herein may also be employed for this purpose.

In the center of the handwheel 110 is a gear 140 which is turned when the handwheel is rotated, provided that the handwheel has been moved out of engagement with the shift lever 114. The gear 140 activates a pump actuator 142, which is connected to the pump 128 by a shaft 144. Activation of the pump actuator by the gear 140 will fill the cylinder with gas, thus moving the piston (not shown) which is connected to the seat slide (122 in FIG. 4). Deactivation of the pump actuator can be accomplished by turning the gear 140 in the opposite direction. This has the ultimate effect of releasing gas from the cylinder and lowering the piston and, hence, the seat slide.

Figure 8:
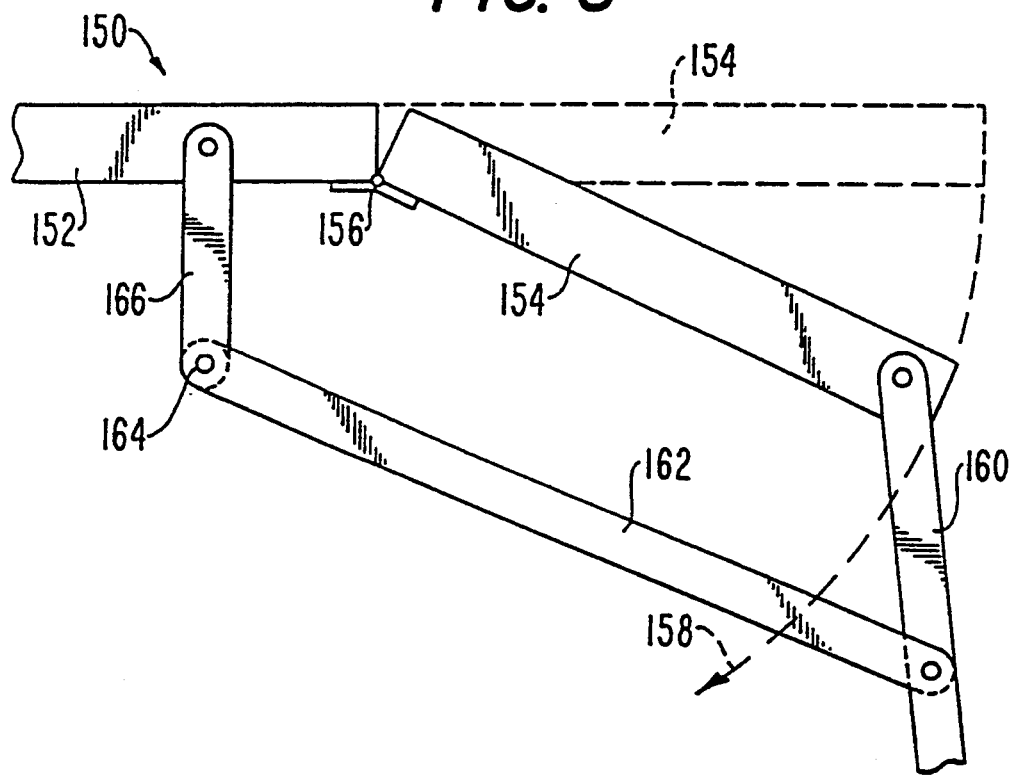
FIG. 8 is a top view of the wheelchair seat and leg rest.
Figure 9:
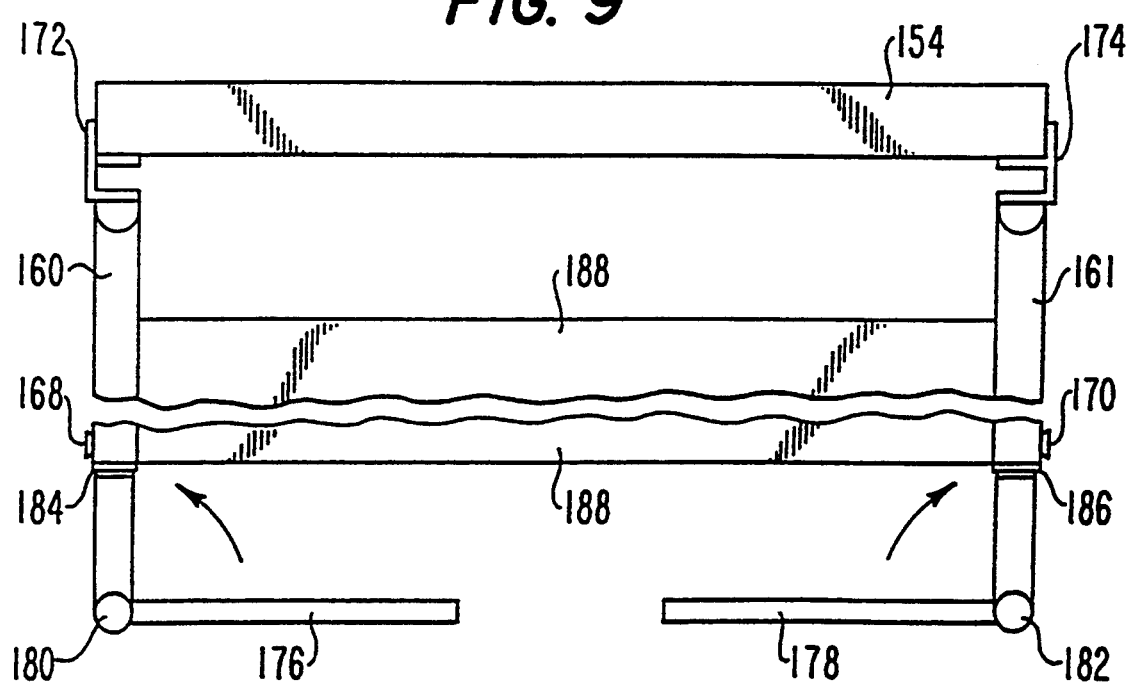
FIG. 9 illustrates, in detail, the movement of the seat and leg rest as the wheelchair is adjusted to move the occupant from a sitting to a standing position.

FIGS. 8 and 9 illustrate in top view and side view, respectively, the retraction of the seat, leg rest and foot rests as the wheelchair is changed from a position where the occupant is fully sitting to one in which the occupant is fully standing. FIG. 8 shows, in side view, how the seat and leg rest structures fold to the rear of the wheelchair and out of the way as the seat slide raises the seat upwards. The seat 150 is formed in two sections, 152 and 154. The front section 154 is pivotally connected to the rear section 152 by a hinge 156 or like member. When the seat slide is raised, the rear seat section 152 is moved toward the rear of the wheelchair, and the front seat section drops downward, generally along the path shown by the arrow 158. The leg rest support 160 is pivoted to the front seat section 154 and is secured to the underside of the rear seat section 152 by a bracket 162 that is pivoted to a seat bracket 166. This bracket may be secured to the underside of the rear seat section 152, as shown in FIG. 8, or may be an extension of the serpentine side frame 64, as shown in FIG. 1.

As the seat front section 154 and leg rest 160 are moved in the direction of the arrow 158, the knobs 168, 170 (FIG. 9) on the outer sides of the leg rest are received in slides (not shown) in the inner surfaces of the base bars. This arrangement assists in guiding the leg rests backward toward the rear of the wheelchair. The leg rest bracket 162 and the front seat section 154 will assume a substantially vertical orientation and will be located well under the rear seat section 152 when the wheelchair is in the standing position.

FIG. 9 illustrates, in front view, additional features of the leg rest and foot rest portions of the wheelchair. The wheelchair includes a left leg rest support 161 in addition to the right leg rest support 160 shown in FIG. 8. The leg rest supports are pivoted to the seat front section 154 by suitable pivotable connectors 172 and 174. Each of the leg rest supports 160, 161 terminates in a foot rest 176, 178. The foot rests 176, 178 are pivoted to the leg rest supports at 180 and 182 so that they may be moved between a position where they support the user's feet and a position where they are folded against the leg rest supports and out of the way.

The distance between the seat front section 154 and the foot rests 176, 178 can be adjusted. On each leg rest a telescoping adjuster 184, 186 is preferably provided so that the length of each leg rest support 160, 161 can be varied to suit the user's comfort. If desired, the telescoping adjuster may use the knobs 168, 170 to secure the telescoped leg rest support at the proper length, as well as to guide the leg rest into and along the slides in the base bar when the position of the wheelchair is being changed from sitting to standing and back to sitting.

The leg rest preferably also includes a padded leg rest section 188 (shown at 58 in FIG. 1) to enhance the comfort of the chair to the user.

When it is desired to fold the wheelchair, the seat is lifted off the seat support pins, and, together with the leg rest padding, is removed from the wheelchair frame to allow the frame sides to be folded together.

The seat and leg rest are preferably made of materials selected to enhance the comfort of the wheelchair user, including padding to support the user's body and legs.

A second embodiment of the wheelchair of the present invention indicated generally at 200 includes a foldable support frame 202 (FIGS. 11-13) which includes spaced side frames 204 and 206. The side frames are identical structures, and consequently like reference numerals will be used to designate identical units in the two side frames. Each side frame includes a curved side bar 208 having a front end which is secured within a front connector 210 and a rear end which is secured within a rear connector 212. A base bar 214 has front and rear ends which are secured within the front and rear connectors respectively to form unitary side frames 204 and 206. Extending upwardly from each rear connector 212 on opposite sides of the support frame 202 are bars 216, the upper ends of which are curved rearwardly and downwardly to form handles 218.

Pivoted front wheels 220 for the wheelchair 200 are secured within the front connectors 210 and are mounted to swivel relative thereto, while the axles 222 for large, non pivoting drive wheels 224 are mounted for rotation relative to the rear connectors 212 within which they are retained. Each axle extends through a housing 226 which encloses the drive mechanism for one of the drive wheels 224, and this housing, which is positioned between a drive wheel and the adjacent rear connector 212, is capable of pivoting about the axle 222 from an upright position to a lowered position shown in broken lines in FIG. 12. The housing is guided by a curved track 228 connected between the bar 216 and the base bar 214, and includes shoes 230 which receive the track. A spring pressed pin 232 engages a hole (not shown) in the track 228 to lock the housing 226 in the upright solid line position of FIG. 12, and the pin is drawn outwardly to release the housing.

Figure 11:
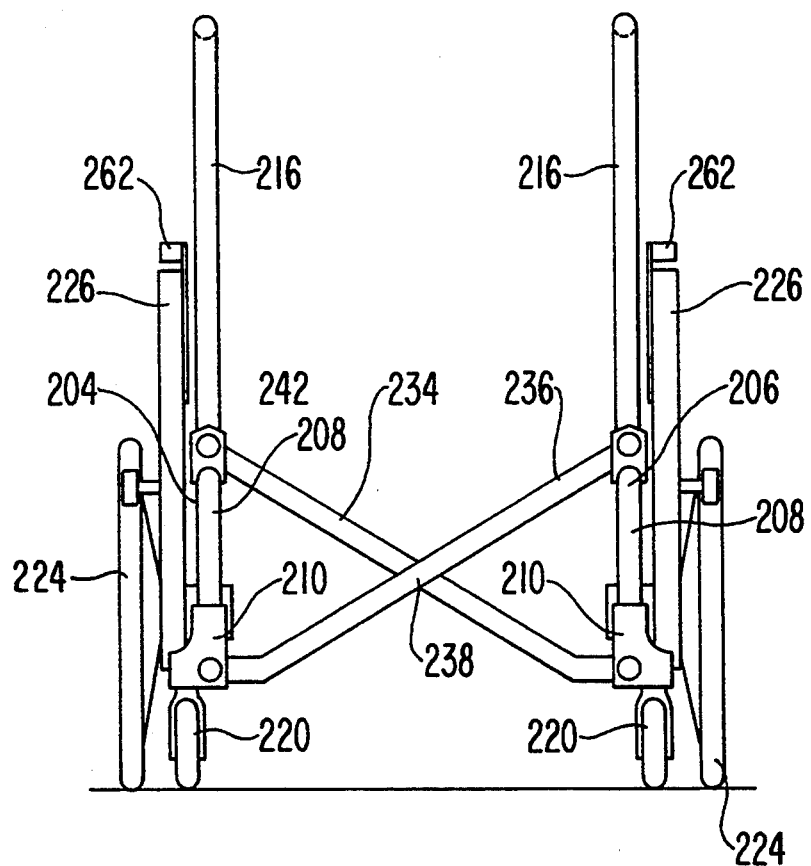
FIG. 11 is a view in from elevation of the support frame for the wheelchair of FIG. 10.
Figure 12:
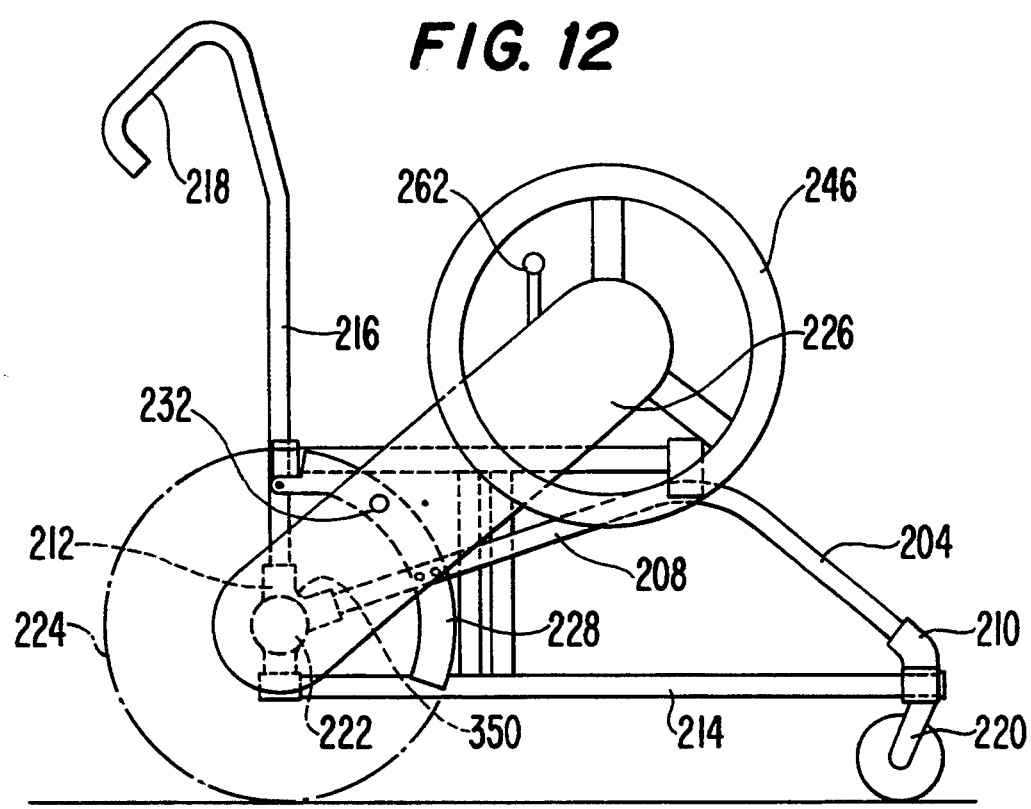
FIG. 12 is a view in side elevation of the support frame of FIG. 11.
Figure 14:
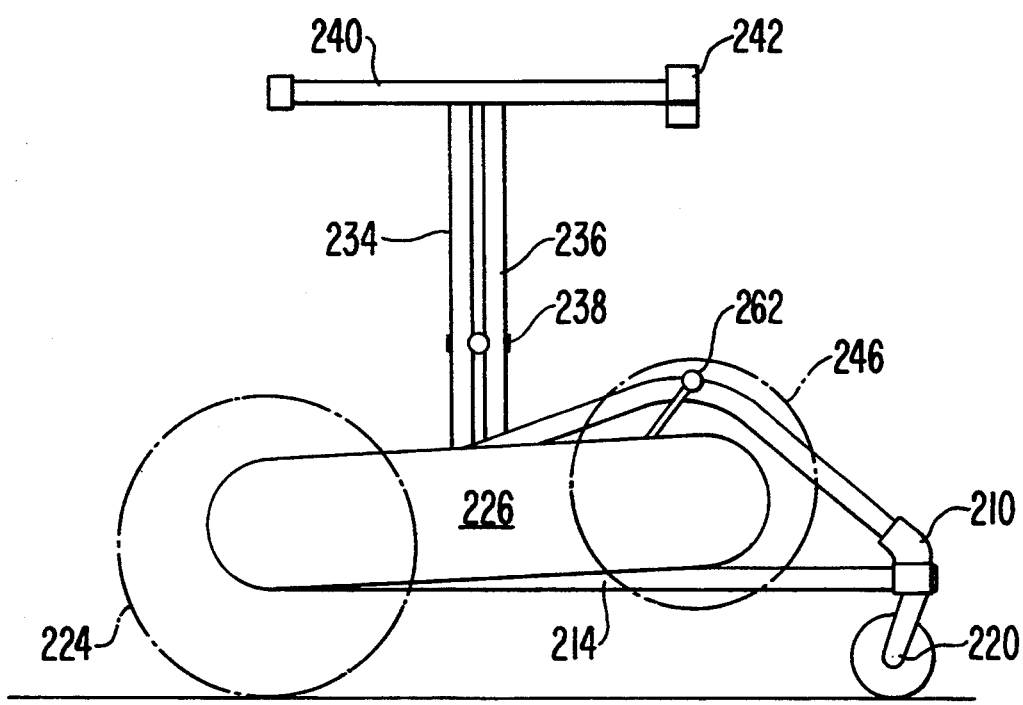
FIG. 14 is a view in side elevation of the support frame of FIG. 11 in a collapsed configuration.
Figure 13:
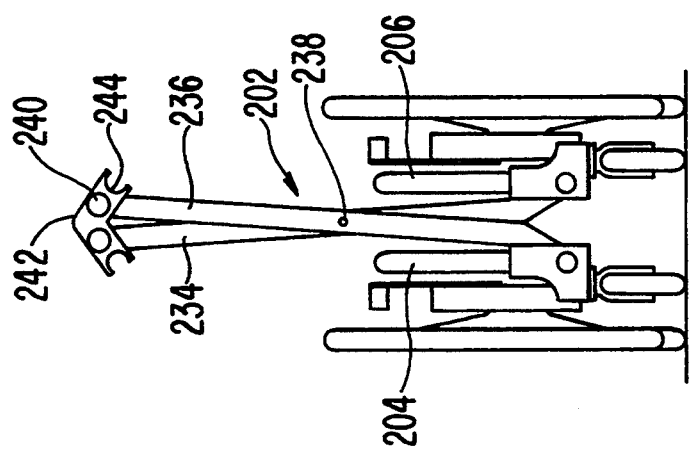
FIG. 13 is a view in front elevation of the support frame of FIG. 11 in a collapsed configuration.

The foldable support frame 202 is completed by centrally pivoted cross bars 234 and 236 which are pivoted at 238. The lower end of each of the pivoted cross bars is mounted to pivot on one of the base bars 214 and the upper end of each cross bar is secured to an upper side bar 240 which it supports. The end of each upper side bar is secured to a connector 242 which has a curved seat 244 to engage the curved side bar 208 of either the side frame 204 or the side frame 206 when the support frame 202 is expanded as shown in FIG. 11. When the support frame is collapsed as shown in FIGS. 13 and 14, the cross bars pivot about the pivot 238 to raise the upper side bars 240 and permit the side frames 204 and 206 to be brought together.

The drive wheels 224 are driven by manually rotatable hand wheels 246 on opposite sides of the wheelchair having axles 248 which extend into and are mounted by the housing 226. Within each housing, the axle 248 is secured to a pulley or sprocket 250, with a pulley being used for a belt drive and a sprocket being used for a chain drive. Rotation of a handwheel will rotate the pulley or sprocket attached to the axle therefor to drive a belt or chain 252 which passes about a lower pulley or sprocket 254. This lower pulley or sprocket is secured to an axle 222 for one of the drive wheels 224. To adjust the tension of the chain or belt, the pulley or sprocket 250 and axle 248 are mounted on a movable mount 256 which is secured to the housing 226 by a threaded bolt 258. This bolt operates to selectively move the mount 256 toward or away from the pulley or sprocket 254 to adjust the belt or chain tension.

A braking mechanism 260 for the wheelchair is mounted within the housing 226 and is controlled by a brake lever 262 extending from the housing. The innermost end of the brake lever is secured to a shaft 266 rotatably mounted on the housing and which is rotated by the brake lever. A link 264 secured to the shaft 266 is pivoted relative to the housing by operation of the brake lever 262. Pivotally connected to the link 264 at one end is a tie rod 268, with the opposite end of the tie rod being pivotally connected to a second link 270. The link 270 operates to rotate a shaft 272 and a brake shoe 274 which is connected to the shaft and extends outwardly of the housing 226. When the brake lever 262 is drawn toward the back of the wheelchair or toward the lower pulley 254 in FIG. 15, the link 264 connected thereto moves toward the pulley 250 causing the tie rod 268 to draw the link 270 in the same direction. The link 270 rotates the shaft 272 to rotate the brake shoe 274 downwardly into engagement with an adjacent drive wheel 224. Once the links 264 and 270 pass over center, the brake shoe 274 is locked against the adjacent drive wheel until the brake lever 264 is pushed toward the front of the wheelchair to unlock the brake.

Figure 10:
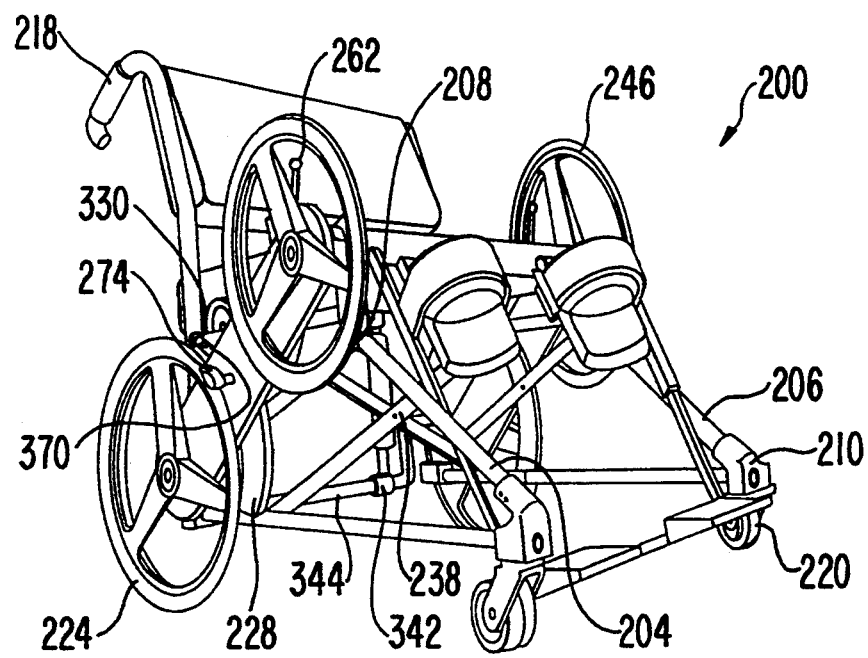
FIG. 10 is a perspective view of a second embodiment of the wheelchair of the present invention.
Figure 17:
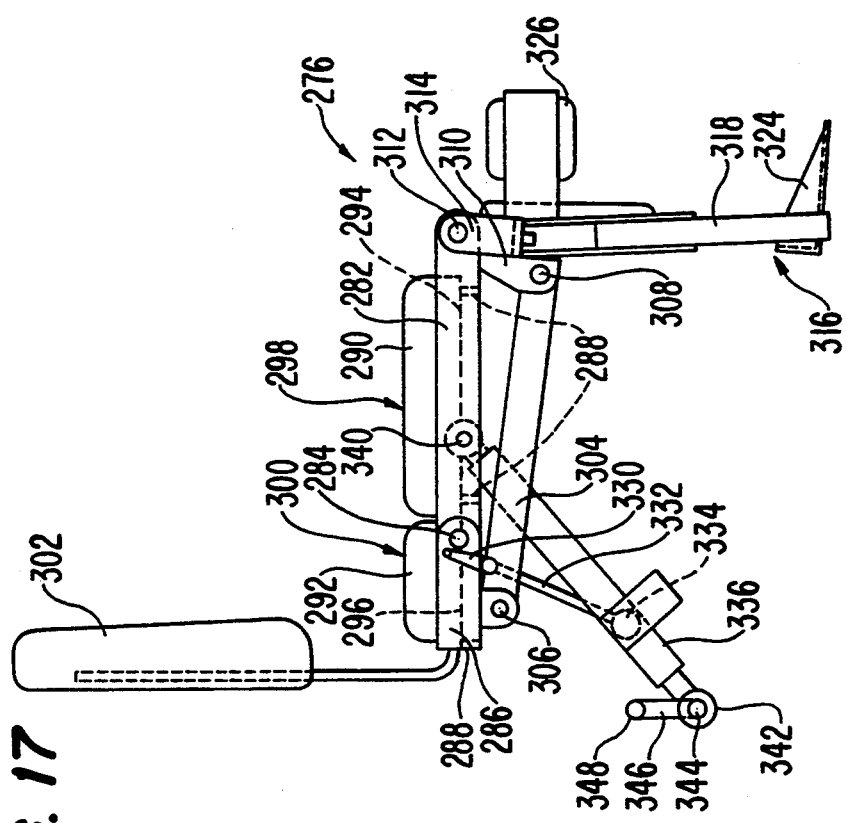
FIG. 17 is a view in side elevation of the seat assembly for the wheelchair of FIG. 10.
Figure 18:
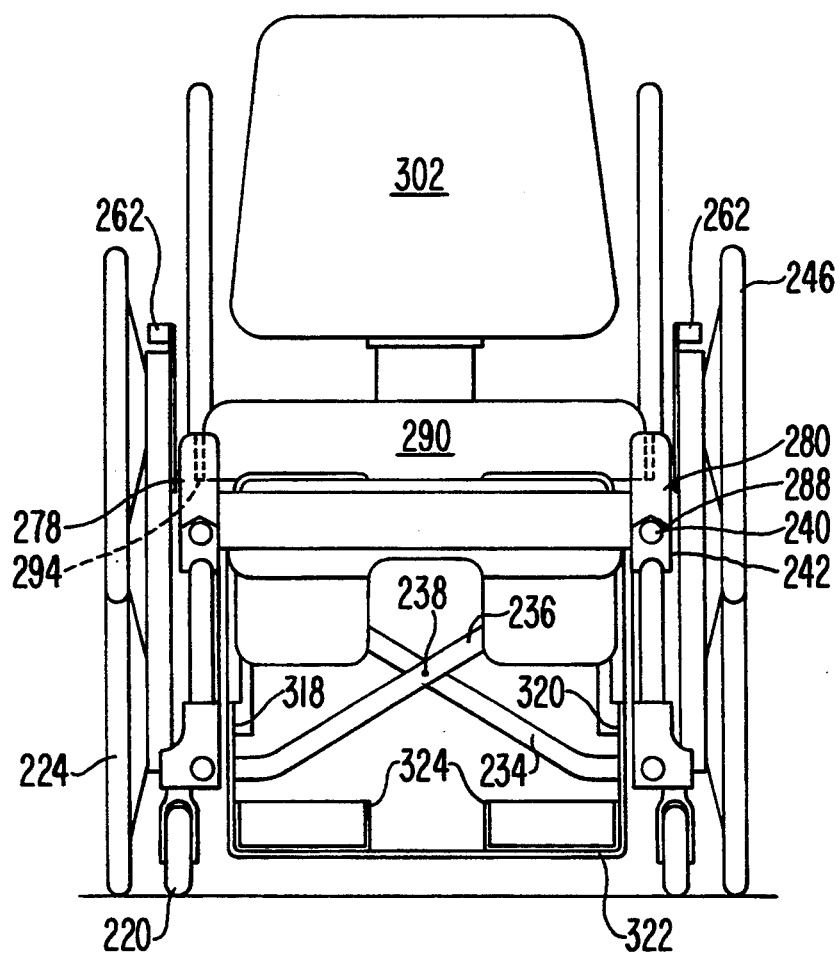
FIG. 18 is a view in front elevation of the wheelchair of FIG. 10.

The wheelchair 200 includes a seat assembly 276 which is snapped onto the foldable support frame 202 but which is separable therefrom. As shown in FIGS. 17 and 10, the seat assembly includes spaced side frame members 278 and 280 which each include a front frame section 282 pivoted at 284 to a rear frame section 286. As illustrated in FIG. 18, the side frame members 278 and 280 have channels 288 extending along the undersides thereof which receive and seat on the upper side bars 240 and connectors 242 of the foldable support frame 202. Connected at either end to the front frame sections 282 and rear frame sections 286 are cross support members 288 which support a front seat cushion 290 and a rear seat cushion 292. The top edges of the front and rear frame sections are formed to provide ledges 294 and 296 respectively (shown in broken lines in FIGS. 17 and 18) to support the outer side edges of the seat cushions 290 and 292, and the cross support members 288 are positioned beneath these ledges.

It will be apparent that the front frame sections 286, front seat cushion 290, and the associated cross support members form a front seat section 298 which may pivot about the pivot 284 relative to rear a seat section 300 formed by the rear frame sections 286, the rear seat cushion 292 and the associated cross support members. A seat back 302 is hingedly connected at 303 to a cross support member 288 for the rear seat section to move from an upright support position as shown in FIG. 17 to a folded position where the seat back is collapsed to rest against the seat cushions 290 and 292.

An elongated support link 304 is pivotally connected at 306 on each side of the seat assembly 276 to one of the rear frame sections 286, and the opposite end of each support link is pivotally connected at 308 to an extension plate 310 which is secured to the front frame section 282. Pivoted at 312 to the front frame section on either side of the wheelchair is a link 314 which is secured to one arm of a "U" shaped footrest 316. This footrest includes side arms 318 and 320 secured to the links 314 and a support section 322 extending between the two side arms. Mounted on the support section are spaced foot support pads 324, and above the foot support pads are leg retainers 326 mounted on a cross bar 328 which extends between the side arms 318 and 320. When the seat assembly 276 is removed from the support frame 202, the seat back 302 can be folded down against the seat cushions 290 and 292 and the footrest 316 can be pivoted about the pivot 312 back against the bottom of the front and rear seat sections to provide a compact unit for transportation or storage.

Figure 20:
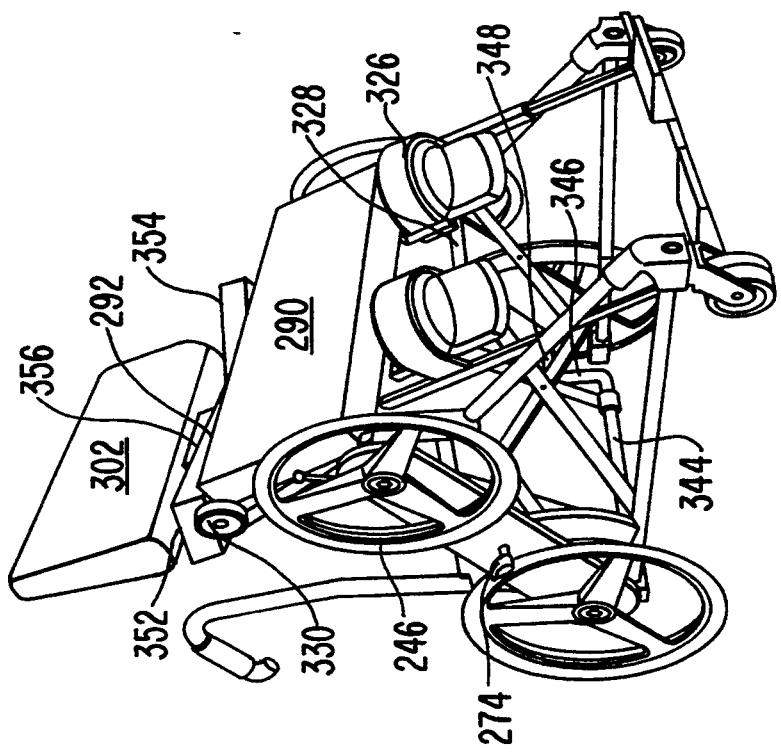
FIG. 20 is a perspective view of the wheelchair of FIG. 10 with the seat assembly in the raised position.
Figure 19:
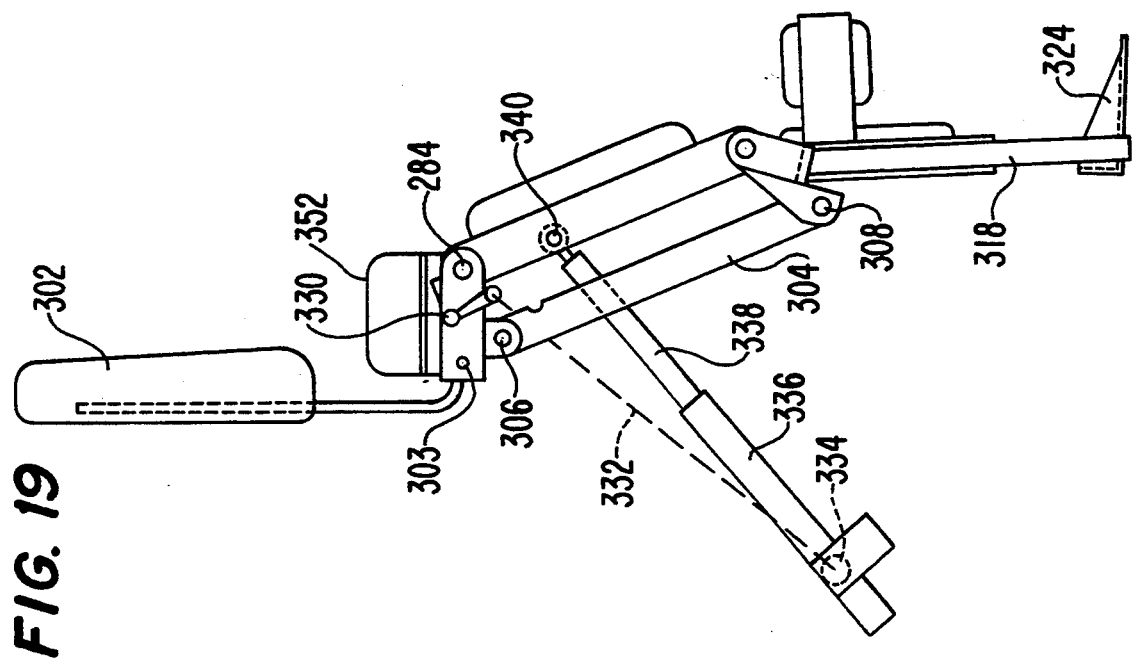
FIG. 19 is a view in side elevation of the seat assembly of FIG. 17 in the raised position.

When the seat assembly 276 is mounted on the support frame 202, it may be raised from an occupant sitting position shown in FIGS. 10, 17 and 18 to an occupant standing position as shown in FIGS. 19 and 20 by the operation of a crank 330 mounted on the rear seat section 300. This crank is connected by a suitable connector 332 to rotate a gear 334 which actuates a pump actuator for a pump, cylinder and piston assembly 336. The pump, cylinder and piston assembly is the same as that illustrated in FIGS. 6 and 7 with the exception that the piston 338 is pivotally secured at 340 to the underside of the front seat section 298 while the opposite end of this assembly is pivotally connected at 342 to a crossbar 344. This crossbar extends across the wheelchair between the side frames 204 and 206, and at each end has an upward extension 346 which terminates at a short laterally extending section 348. The laterally extending sections at either end of the crossbar rest in a seat 350 (FIG. 12) formed by the rear connectors 212.

As will be noted in FIGS. 19 and 20, when the crank 330 is rotated to drive the seat assembly 276 from the lowermost position with the occupant sitting to the uppermost position where the occupant is standing, the seat assembly is driven forwardly and upwardly. As the piston 338 expands, the connector 332, which may be a flexible cable with an inner rotating link to turn the gear 334, causes the gear to rotate in the same manner as the gear 140 in FIGS. 6 and 7 to activate a pump actuator 142 contained in the pump, cylinder and piston assembly 336. Gas is pumped into the cylinder and the piston 338 drives the seat assembly upwardly. As the seat assembly rises, the support link 304 also rises and pivots about the pivots 306 and 308, and the rear seat section 300 maintains its relationship with the seat back 302. However, the front seat section 298 pivots downwardly about the pivot 284 behind the user's legs, while the rear seat section continues to provide support for the user's buttocks. It will be noted in FIG. 20 that in the raised position, the seat assembly angles rearwardly from bottom to top at a five to ten degree angle. This causes the user's weight to be forced back against the seat assembly, but the angle is not great enough to interfere with the user's ability to function in the standing position.

Figure 21:
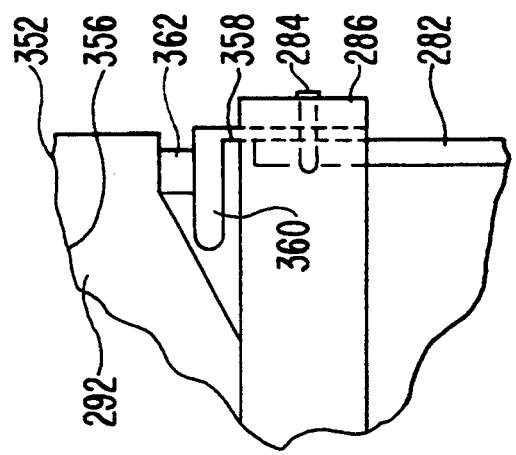
FIG. 21 is an end view of a portion of the seat assembly of FIG. 19.

If a user operates with the seat assembly 276 in the uppermost position of FIGS. 19 and 20 for extended periods of time, pressure between the rear seat cushion 292 and the tailbone and ischials of the user may result in some discomfort. To relieve this pressure, the side edges 352 and 354 of the rear seat cushion 292 are driven upwardly above the plane of a center portion 356 as the seat assembly rises by a mechanism positioned beneath the side edges, one such mechanism being shown in FIG. 21. This raising of the side edges of the rear cushion 292 causes the cushion to "dish" toward the center portion as indicated at 356 and relive pressure on the tailbone and ischials of a user.

To raise the edges of the rear cushion 292, an arm 358 is secured to each front frame section 282 so as to extend beyond the pivoted end thereof. When the seat assembly is raised and the front frame sections drop down around the pivot 284, the arms 358 pivot up beneath the side edges 352 and 354 of the rear cushion raising them above the center portion 356. A laterally extending projection 360 is formed on the top of each arm and engages a bar 362 which extends beneath the side edge of the rear cushion substantially parallel to the rear frame section 286. The bar 362 may be attached in any suitable manner to the rear seat section so as to facilitate upward movement of the bar when it is engaged by the lateral projection 360. For example, the bar may be pivoted at one end to a cross support member 288, and it is also desirable for this pivoted end to have limited lateral movement in a track secured to the cross support member. This permits the bar to be adjusted laterally along the lateral projection 360 to adjust the curvature of the rear seat cushion 292. Alternatively, the bar 362 could be held in a track attached to the bottom of the rear seat section 300 to permit lateral adjustment of the bar.

Before the seat assembly 276 is raised from the lowermost sitting position of the uppermost standing position, it is beneficial to insure that the wheelchair drive wheels 224 are locked so that the wheelchair will not accidentally begin to roll as the occupant is being raised. A simple method for accomplishing this is to prevent operation of the crank 330 until the drive wheels are locked. As will be noted in FIG. 15, a second link 362 is secured to the shaft 266 to rotate therewith. A rod 364 is pivotally connected at 366 to the link 362 and is mounted to slide in a retainer 368 mounted on the housing 226. Secured to the rod 364 intermediate the pivotally connected end 366 and the retainer 368 is a laterally projecting stop 370. This stop projects through a slot 372 in the top of the housing and will engage and prevent rotation of the crank 330 when the drive wheels 224 are unlocked. When the brake lever 262 is moved toward the pulley 222 to lock the drive wheel, the link 362 moves the rod 364 toward the pulley 222 and the stop 370 moves in the slot 372 out of the path of the crank 330, the crank may now be rotated to raise the seat assembly 276.

Figure 22:
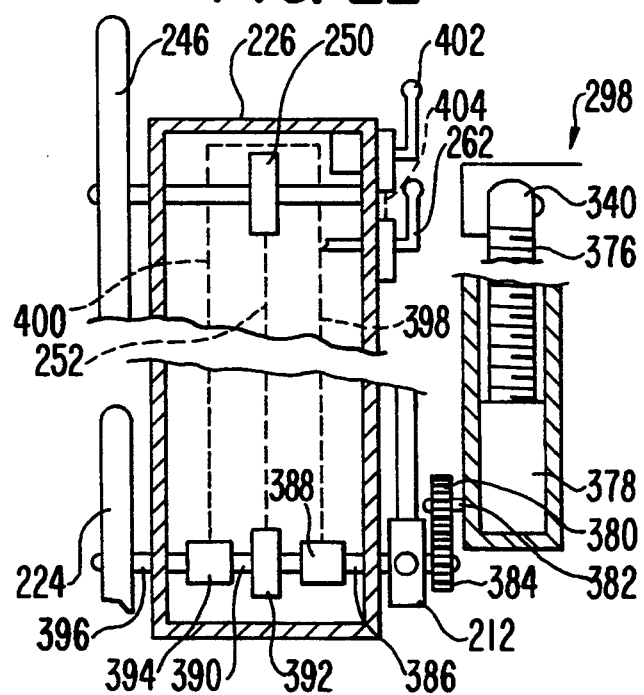
FIG. 22 is a sectional view of a second embodiment of the drive housing and drive mechanism for the wheelchair of FIG. 10.

Referring now to FIG. 22, it will be noted that it is possible to use the handwheels 246 both to drive the wheelchair as well as to raise and lower the seat assembly 276. This is often preferable, as it is easier to apply more power to the dual handwheels than it is to the smaller crank 330.

In FIG. 22, the pump cylinder and piston assembly 336 attached to the front seat section 298 is replaced by a cylinder 374 which contains an elongated threaded screw 376 that is pivotally connected at 340 in the same manner as was the piston 338. The screw 376 is extended and retracted by a mechanism 378 which is driven by a gear 380, and the mechanism 378 contains known transmission gearing for converting the rotation of a shaft 382 driven by the gear 380 to rotation of a restrained threaded member in the mechanism 378 which receives the screw 376. The threaded member operates in response to rotation of the gear in one of two opposite directions to extend or retract the screw.

When the seat assembly 276 is mounted on the support frame 202, the cylinder 374 is supported on the support frame in the same manner as the pump, cylinder and piston assembly 336, although any suitable means for removably supporting the cylinder on the support frame can be employed. With the seat assembly and its attached threaded screw 376 and cylinder 374 in place on the support frame 202, the gear 380 will mesh with a gear 384 which is mounted on a stub shaft 386 extending from the housing 226 through the rear connector 212. The stub shaft 386 is mounted for rotation relative to the rear connector, and within the housing extends outwardly from a clutch 388. This clutch selectively connects and drives the stub shaft 386 from a shaft 390 which drives the clutch by means of a pulley or sprocket 392 secured to the center of the shaft 390. The shaft 390 also drives a second clutch 394 which selectively connects and drives a stub axle 396 for a drive wheel 224.

The clutches 388 and 394 are connected by suitable control linkages 398 and 400 respectively to a clutch control lever 402. When the clutch control lever is moved in one direction; i.e. rearwardly, the linkages 398 and 400 operate so that the clutch 394 engages and the clutch 388 disengages. Now rotation of the handwheel 246 and the pulley or sprocket 250 drives the belt or chain 252 which operates to drive the pulley or sprocket 392. The drive wheel 224 will be driven, as the clutch 394 is engaged, but the stub shaft 386 and gear 384 will not be driven as the clutch 388 is disengaged.

Conversely, when the clutch control lever 402 is moved in the opposite direction; i.e. forwardly, the linkages 398 and 400 cause the clutch 394 to disengage and the clutch 388 to engage. Now rotation of the handwheel 246 will not drive the drive wheel 224, but instead will drive the stub shaft 386 and gear 384 to cause rotation of the gear 380 and thus extension or retraction of the threaded screw 376. This in turn will raise or lower the seat assembly in the manner illustrated in FIGS. 19 and 20.

When the clutch 394 is disengaged and the clutch 388 is engaged, it is desirable to insure that the drive wheel 224 is locked by the brake mechanism of FIGS. 15 and 16 operated by the brake lever 262. This can be accomplished by any suitable linkage indicated at 404 between the brake lever and the clutch control lever 402 which will prevent the clutch control lever from engaging the clutch 388 until the brake is set. For example, this linkage could be a cam or stop which would permit movement of the clutch control lever to engage the clutch 394 regardless of the position of the brake lever 262, but which would block movement of the clutch control lever 402 to engage the clutch 388 until the brake lever is moved to a position where the brake locks the drive wheel 224.

INDUSTRIAL APPLICABILITY

The present invention provides a lightweight, easily operated wheelchair which gives excellent support for a handicapped person while the occupant is in a sitting or standing position. In the standing position, the chair moves the occupant forwardly so that objects in front of the chair are within reach. The chair may be easily disassembled into a support frame and a seat assembly, both of which are lightweight and may be folded separately to facilitate storage. By separating the wheelchair into two sections, handling is facilitated for each section is much lighter than the weight of the complete wheelchair.

I claim:

1. A two piece wheelchair for transporting an occupant comprising:

a support assembly means, said support assembly means including first and second spaced side frames, wheelchair support wheels mounted for rotation upon said first and second side frames, said wheelchair support wheels including at least one drive wheel, and wheelchair drive means mounted upon at least one of said first and second side frames and operative to drive said drive wheel, said wheelchair drive means including a manually rotatable hand wheel and transmission means connected between said handwheel and said drive wheel to transmit rotary motion of said hand wheel to said drive wheel, and a seat assembly means independent of said support assembly means removably mounted upon said support assembly means and including a seat for supporting the buttocks of an occupant having a front section and a rear section, and a seat back connected to the rear section of said seat and seat drive means operative to engage said support assembly means when said seat assembly means is mounted upon said support assembly means, said seat drive means operating to drive said seat and seat back relative to said support assembly means between a lowermost position relative to said wheelchair support wheels and an uppermost position spaced above said lowermost position wherein said seat assembly means operates to move an occupant of said wheelchair between a sitting position in the lowermost position of said seat and seat back to a standing position in said uppermost position of said seat and seat back, said seat being articulated with said front section being pivotally connected to said rear section, said seat assembly means including seat support means operative to cause said front section to extend outwardly in substantially the same plane as the rear section when said seat and seat back are in the lowermost position while causing the front section to pivot downwardly from the rear section when said seat and seat back are moved to the uppermost position, said rear seat section including a center portion and side portions on either side of said center portion, all of which extend in substantially the same plane when said seat and seat back are in the lowermost position, said seat support means operating to raise said side portions above said center portion of said rear section when said seat and seat back are moved to the uppermost position.

2. The two piece wheelchair of claim 1 wherein said support assembly means and said seat assembly means are each collapsible when said seat assembly means is removed from said support assembly means, said support assembly means including cross brace means extending between said first and second side frames and operable in a first extended position to space said side frames to permit the mounting of said seat assembly on said support assembly and in a second folded position to permit said first and second side frames to be brought together to reduce the space therebetween.

3. The two piece wheelchair of claim 2 wherein said seat assembly means includes mounting means to connect said seat back to the rear section of said seat, said mounting means operating to permit said seat back to be folded against said seat, and leg support means connected to the front section of said seat, said leg support means being foldable against said seat when said seat assembly means is removed from said support assembly means.

4. The two piece wheelchair of claim 3 wherein said wheelchair drive means is mounted to position said manually rotatable hand wheel adjacent to the front section of said seat when said seat assembly means is mounted on said support assembly means.

5. The two piece wheelchair of claim 4 which includes a drive wheel mounted on each of said first and second side frames, said wheelchair drive means including a manually rotatable hand wheel and transmission means mounted on each of said first and second side frames.

6. The two piece wheelchair of claim 5 wherein said wheelchair drive means includes a housing mounted on each of said first and second side frames, each said manually rotatable hand wheel being mounted for rotation upon one of said housings, each said housing containing a transmission means connected between a drive wheel and the manually rotatable hand wheel mounted on said housing.

7. The two piece wheelchair of claim 6 wherein each said drive wheel includes an axle mounted on one of said first and second side frames, each of said housings being pivotally mounted upon an axle for one of said drive wheels, and housing mounting means connected to each said housing and adapted to releasably secure said housing to one of said first and second side frames, said housing mounting means being operable to release said housing from a side frame to permit the housing to pivot relative to the axle for a drive wheel.

8. A two piece wheelchair for transporting an occupant comprising:
a support assembly means, said support assembly means including first and second spaced side frames,
wheelchair support wheels mounted for rotation upon said first and second side frames, said wheelchair support wheels including at least one drive wheel, and wheelchair drive means mounted upon at least one of said first and second side frames and operative to drive said drive wheel, said wheelchair drive means including a manually rotatable hand wheel and transmission means connected between said handwheel and said drive wheel to transmit rotary motion of said hand wheel to said drive wheel, and
a seat assembly means independent of said support assembly means removably mounted upon said support assembly means, said seat assembly means including a seat for supporting the buttocks of an occupant having a front section and a rear section, and a seat back connected to the rear section of said seat and seat drive means operative to engage said support assembly means when said seat assembly means is mounted upon said support assembly means, said seat drive means operating to drive said seat and seat back relative to said support assembly means between a lowermost position relative to said wheelchair support wheels and an uppermost position spaced above said lowermost position, said support assembly means including manually operable brake means operable in an engagement position to engage and prevent rotation of said drive wheel and in a disengagement position to permit rotation of said drive wheel and safety locking means operable by said brake means, said safety locking means operating when said seat assembly means is mounted upon said support assembly means with said seat and seat back in the lowermost position to prevent operation of said seat drive means if said brake means is in the disengagement position.

9. The two piece wheelchair of claim 8 wherein said handwheel is mounted for movement relative to said side frames between a lower position relative to the wheelchair support wheels and an upper position spaced above said lower position.

10. A wheelchair for transporting an occupant comprising,
a structural frame;
wheelchair support wheels mounted for rotation on said frame;
manually operable brake means mounted upon said frame, said manually operable brake means operating in an engagement position to engage and prevent rotation of at least one of said support wheels and in a disengagement position to permit rotation of said support wheels, seat means mounted upon said frame, said seat means including drive means to drive said occupant supporting seat for movement relative to said frame between a lowermost position to an uppermost position spaced above said lowermost position,
and safety locking means connected for operation by said brake means, said safety locking means operating when said occupant supporting seat is in the lowermost position to prevent operation of said drive means if said brake means is in the disengagement position.

11. The wheelchair of claim 10 which includes a manually operated handwheel means mounted on said frame for operation by an occupant, said handwheel means operating to power said drive means, and being mounted for movement relative to said frame between a lower position relative to said wheelchair support wheels and an upper position spaced above said lower position.

12. A wheelchair for transporting an occupant comprising:
a structural frame;
wheelchair support wheels mounted for rotation on said frame;
seat means including an occupant supporting seat; said seat means including drive means operative to change the contour of said occupant supporting seat, and seat support means for supporting said occupant supporting seat, said occupant supporting seat including a section having an upper support surface with a center portion and side portions on either side of said center portion which extend in substantially the same plane when said occupant supporting seat is in a first position, said seat support means operating in response to operation of said drive means to raise said side portions above the plane of said center portion to dish said upper support surface from said side portions toward said center portion thereof.

13. The wheelchair of claim 12 wherein said drive means operates to drive said occupant supporting seat relative to said frame between a lowermost position where said occupant supporting seat is in said first position and an uppermost position spaced above said lowermost position, said seat means including a seat supporting frame means for said occupant supporting seat, said seat supporting frame means operating to raise the side portions of said seat above the center portion when said drive means moves said seat to the uppermost position.

14. The wheelchair of claim 13 wherein said occupant supporting seat includes a from section and a rear section, said rear section forming the section with said side portions which are raised by said seat supporting frame means.

15. The wheelchair of claim 14 wherein said front section is pivoted to said rear section, said seat supporting frame means operating to cause said front section to extend outwardly in substantially the plane of said rear section when said occupant supporting seat is in the lowermost position and to pivot downwardly from said rear section as said occupant supporting seat moves from said lowermost position to said uppermost position.

16. The wheelchair of claim 15 wherein said drive means includes a piston unit having a piston connected to said occupant supporting seat and a fluid containing cylinder, said piston being movable within said cylinder, and a hand driven unit mounted on said seat means and connected to operate said piston unit to move said occupant supporting seat between said lowermost and uppermost positions.

17. The wheelchair of claim 16 wherein said drive means includes pump means operable by said hand driven unit to selectively supply fluid to the cylinder of said piston unit or to withdraw fluid from said cylinder.

18. The wheelchair of claim 13 which includes manually operable brake means mounted upon said frame, said manually operable brake means operating in a first engagement position to engage and prevent rotation of at least one of said support wheels and in a second disengagement position to permit rotation of said support wheels, and
safety locking means connected for operation by said brake means, said safety locking means operating with said occupant supporting seat in the lowermost position to prevent operation of said drive means if said brake means is in the second disengagement position.

19. The wheelchair of claim 12 wherein said occupant supporting seat includes a seat cushion having an upper support surface which provides the upper support surface with said center portion and side portions, said side portions extending along substantially the full extent of said seat cushion on opposite sides thereof, said seat support means operating in response to the operation of said drive means to raise said side portions, to dish the upper support surface of said seat cushion toward said center portion.

20. The wheelchair of claim 19 wherein said drive means includes a manually rotatable handwheel mounted upon said structural frame and transmission means connected between said handwheel and said seat support means to transmit rotation of said handwheel to cause said seat support means to change the contour of said occupant supporting seat.

21. The wheelchair of claim 20 wherein a wheel drive means is mounted upon said structural frame and is connected to drive at least one of said wheelchair support wheels, and shift control means are mounted upon said frame and operable to selectively and individually connect said handwheel to said wheel drive means and said transmission means.

22. A wheelchair for transporting an occupant comprising:
a structural frame;
wheelchair support wheels mounted for rotation on said frame;
a seat assembly mounted on said frame including an occupant supporting seat having a front and a rear seat section, said front seat section being pivotally connected to said rear seat section, and seat support means operative in a first position to cause said front seat section to extend in substantially the same plane as the rear seat section and in a second position to cause the front seat section to pivot downwardly from the rear seat section;
and rear seat section contour means operating to engage said rear seat section in said second position of said seat support means to change the contour of said rear seat section.

23. The wheelchair of claim 22 wherein said rear seat section includes a center portion, side portions on opposite sides of said center portion and an upper support surface extending across said center and side portions, said rear seat section contour means operating in the second position of said seat support means to raise said side portions of said rear seat section above said center portion to dish said upper support surface from said side portions toward said center portion.

24. The wheelchair of claim 23 wherein said contour means includes contour arms mounted on said front seat section to extend outwardly therefrom beneath the side portions of said rear seat section in the first position of said seat support means, said contour arms pivoting upwardly into engagement with said side portions of said rear seat section to raise said side portions when said front seat section pivots downwardly in the second position of said seat support means.

25. The wheelchair of claim 24 wherein said rear seat section includes a cushion having said upper support surface.

26. The wheelchair of claim 24 which includes drive means mounted on said frame for selectively and individually driving at least one of said support wheels and said seat support means between said first and second positions.

27. The wheelchair of claim 26 wherein said drive means includes a manually rotatable handwheel mounted on said frame to power said drive means and shift control means mounted on said frame which operates to connect said drive means to selectively drive individually said at least one wheelchair support wheel and said seat support means.

28. The wheelchair of claim 27 wherein said handwheel is mounted for movement relative to said frame between a lower position relative to said wheelchair support wheels and an upper position spaced above said lower position.

29. The wheelchair of claim 28 wherein said wheelchair support wheels include a drive wheel having an axle mounted on said frame, said drive means including a housing containing transmission means, said manually rotatable handwheel being mounted on said housing and said housing being pivotally mounted on an axle to raise or lower said manually rotatable handwheel between said lower and upper positions.

30. The wheelchair of claim 26 wherein said wheelchair includes propulsion means including manually actuatable means operable to prevent movement of said wheelchair support wheels in either a forward or rearward direction.

* * * * *